(12) United States Patent
Aio et al.

(10) Patent No.: US 12,328,750 B2
(45) Date of Patent: Jun. 10, 2025

(54) COMMUNICATION APPARATUS AND INFORMATION PROCESSING METHOD

(71) Applicant: Sony Group Corporation, Tokyo (JP)

(72) Inventors: Kosuke Aio, Tokyo (JP); Ryuichi Hirata, Tokyo (JP); Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 337 days.

(21) Appl. No.: 17/767,049

(22) PCT Filed: Oct. 26, 2020

(86) PCT No.: PCT/JP2020/040050
§ 371 (c)(1),
(2) Date: Apr. 7, 2022

(87) PCT Pub. No.: WO2021/090718
PCT Pub. Date: May 14, 2021

(65) Prior Publication Data
US 2022/0303997 A1 Sep. 22, 2022

(30) Foreign Application Priority Data

Nov. 8, 2019 (JP) ................. 2019-203109

(51) Int. Cl.
H04W 72/541 (2023.01)
H04L 1/00 (2006.01)
(Continued)

(52) U.S. Cl.
CPC ......... *H04W 72/541* (2023.01); *H04L 1/0003* (2013.01); *H04W 52/243* (2013.01); *H04W 76/15* (2018.02); *H04W 84/12* (2013.01)

(58) Field of Classification Search
CPC . H04W 72/541; H04W 52/243; H04W 76/15; H04W 84/12; H04W 24/10;
(Continued)

(56) References Cited

U.S. PATENT DOCUMENTS

2009/0225658 A1* 9/2009 Rezvani ................. H04L 45/00
370/254
2016/0020894 A1* 1/2016 Tetzlaff ................ H04L 1/0018
370/278
(Continued)

FOREIGN PATENT DOCUMENTS

JP 2009-206538 A 9/2009
JP 2017-28746 A 2/2017
(Continued)

OTHER PUBLICATIONS

International Search Report and Written Opinion mailed on Dec. 22, 2020, received for PCT Application PCT/JP2020/040050, Filed on Oct. 26, 2020, 9 pages including English Translation.
(Continued)

Primary Examiner — Kan Yuen
(74) Attorney, Agent, or Firm — XSENSUS, LLP

(57) ABSTRACT

The present technology relates to a communication apparatus and an information processing method that make it possible to appropriately reduce inter-link interference.
The communication apparatus according to the present technology acquires, in a case of simultaneously performing transmission and reception of a data signal with another communication apparatus using a plurality of Links, first interference information concerning interference between Links occurring in the other communication apparatus from the other communication apparatus, and decides a transmission parameter to be used by the other communication apparatus for transmission of a data signal on a basis of the first interference information and second interference infor-
(Continued)

mation concerning interference between the Links occurring in the communication apparatus. The present technology is applicable to a wireless communication system.

18 Claims, 18 Drawing Sheets

(51) Int. Cl.
 *H04W 52/24* (2009.01)
 *H04W 76/15* (2018.01)
 *H04W 84/12* (2009.01)
(58) Field of Classification Search
 CPC .............. H04W 72/0446; H04W 88/02; H04L 1/0003; H04B 17/345
 See application file for complete search history.

(56) References Cited

U.S. PATENT DOCUMENTS

| | | | |
|---|---|---|---|
| 2017/0111196 A1* | 4/2017 | Su | H04L 27/2602 |
| 2019/0150214 A1* | 5/2019 | Zhou | H04W 76/15 370/329 |
| 2020/0154443 A1* | 5/2020 | Patil | H04W 72/30 |
| 2020/0163141 A1* | 5/2020 | Hsu | H04W 52/0209 |
| 2020/0288523 A1* | 9/2020 | Patil | H04W 80/02 |
| 2021/0076413 A1* | 3/2021 | Lu | H04W 74/002 |
| 2021/0136819 A1* | 5/2021 | Seok | H04W 74/0816 |
| 2022/0182132 A1* | 6/2022 | Hirai | H04B 17/345 |

FOREIGN PATENT DOCUMENTS

| | | |
|---|---|---|
| JP | 2019-57756 A | 4/2019 |
| JP | 2019-62516 A | 4/2019 |
| WO | WO-2013064526 A1 | 5/2013 |
| WO | 2018/016167 A1 | 1/2018 |
| WO | 2018/220962 A1 | 12/2018 |
| WO | WO-2019071580 A1 | 4/2019 |

OTHER PUBLICATIONS

Dmitry Akhmetov (Intel) : "Performance aspects of Multi-link operations with constraints", IEEE Draft; 11-19-1541-00-00BE-PERFORMANCE-ASPECTS-OF-MULTI-LINK-OPERATIONS-WITH-CONSTRAINTS, IEEE-SA Mentor, Piscataway, NJ USA, vol. 802.11 EHT; 802.llbe Sep. 12, 2019 (Sep. 12, 2019), pp. 1-13, XP068153611.

Yongho Seok (Mediatek) :"Multi-link Operation", IEEE Draft; 11-19-0731-00-00BE-MULTI-LINK-OPERATION, IEEE-SA Mentor, Piscataway, NJ USA vol. 802.11 EHT; 802.llbe, May 16, 2019 (May 16, 2019), pp. 1-17, XP068151395.

Yunbo Li (Huawei) : "channel access in multi-band operation", IEEE Draft; 11-19-1116-00-00BE-CHANNEL-ACCESS-IN-MULTI-Band-Operation, IEEE-SA Mentor, Piscataway, NJ USA vol. 802.11 EHT; 802.llbe Jul. 10, 2019 (Jul. 10, 2019), pp. 1-16, XP068152826.

* cited by examiner

FIG. 8

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | STR |
| 9-15 | Reserved |

FIG. 10

| STR MCS | STR Target RSSI | ... |
|---|---|---|

FIG. 16

| Element ID | Length | STR MCS | STR target RSSI | ... |
|---|---|---|---|---|

COMMUNICATION APPARATUS AND INFORMATION PROCESSING METHOD

CROSS-REFERENCE TO RELATED APPLICATIONS

The present application is based on PCT filing PCT/JP2020/040050, filed Oct. 26, 2020, which claims priority to Japanese Patent Application No. 2019-203109, filed Nov. 8, 2019, the entire contents of each are incorporated herein by reference.

TECHNICAL FIELD

The present technology relates, in particular, to a communication apparatus and an information processing method that make it possible to appropriately reduce inter-link interference.

BACKGROUND ART

In order to cope with a recent increase in data traffic, it has been required to expand data capacity and improve maximum throughput in a wireless LAN (Local Area Network).

As one example of a method for achieving the above, attention has been paid to a Multi-Link Operation (hereinafter, referred to as "MLO") in which communication is performed using a plurality of frequency bands simultaneously, as disclosed in PTL 1, for example. The MLO is expected to be standardized in the next-generation standard of IEEE 802.11.

In an MLO terminal, which is a terminal enabling communication with the MLO, it is important for each Link to appropriately perform an operation to transmit and receive data simultaneously. Hereinafter, the operation of the MLO terminal to transmit and receive data simultaneously using a plurality of Links is referred to appropriately as an STR (Simultaneously Tx And Rx) operation.

For example, in a case where a certain MLO terminal transmits data using two Links of Link A and Link B, the Link A is able to achieve a higher PHY rate than that of the Link B, which may allow data transmission through the Link A to be finished faster than data transmission through the Link B, in some cases. One reason for this to occur is that available MCS (Modulation and Coding Scheme) and bandwidth differ for each Link.

In such a case, it is desirable for the MLO terminal on transmission side to receive Block Ack first through the Link A while continuing data transmission through the Link B and to start data transmission again.

In addition, the STR operation also enables Full Duplex communication, for example, in which a wireless base station performs UL (Up Link) communication with a terminal B using the Link B in the middle of performing DL (Down Link) communication with a terminal A using the Link A.

In this manner, the MLO terminal performs the STR operation to thereby be able to achieve more efficient MLO communication.

CITATION LIST

Patent Literature

PTL 1: Japanese Unexamined Patent Application Publication No. 2017-28746 1

SUMMARY OF THE INVENTION

Problem to be Solved by the Invention

In a case where an STR operation is performed in an MLO terminal, inter-link interference in an own apparatus becomes an issue. For example, in the middle of receiving a signal through a Link A, a certain MLO terminal starts transmission of another signal through a Link B; in this case, a transmission signal through the Link B may enter a reception unit of the Link A as an interference signal to degrade the quality of the signal being received through the Link A.

Although it is common to employ a hardware configuration to reduce the inter-link interference, it is not necessarily possible for all MLO terminals to sufficiently remove the inter-link interference with the hardware configuration. The degree of an influence by the inter-link interference depends largely on implementation of the MLO terminal.

The present technology has been made in view of such circumstances, and is directed to enabling appropriate reduction in inter-link interference.

Means for Solving the Problem

A communication apparatus of a first aspect of the present technology includes a communication control section that acquires, in a case of simultaneously performing transmission and reception of a data signal with another communication apparatus using a plurality of Links, first interference information concerning interference between Links occurring in the other communication apparatus from the other communication apparatus, and decides a transmission parameter to be used by the other communication apparatus for transmission of a data signal on a basis of the first interference information and second interference information concerning interference between the Links occurring in the communication apparatus.

A communication apparatus of a second aspect of the present technology includes a communication control section that transmits, to another communication apparatus, first interference information concerning interference between Links occurring in a case of simultaneously performing transmission and reception of a data signal with the other communication apparatus using a plurality of Links, and acquires a transmission parameter to be used for transmission of a data signal decided by the other communication apparatus on a basis of the first interference information and second interference information concerning interference between the Links occurring in the other communication apparatus.

In the first aspect of the present technology, in a case of simultaneously performing transmission and reception of a data signal with another communication apparatus using a plurality of Links, first interference information concerning interference between Links occurring in the other communication apparatus is acquired from the other communication apparatus, and a transmission parameter to be used by the other communication apparatus for transmission of a data signal is decided on a basis of the first interference information and second interference information concerning interference between the Links occurring in the communication apparatus.

In the second aspect of the present technology, first interference information concerning interference between Links occurring in a case of simultaneously performing transmission and reception of a data signal with another communication apparatus using a plurality of Links is transmitted to the other communication apparatus, and a transmission parameter to be used for transmission of a data signal decided by the other communication apparatus on a basis of the first interference information and second interference information concerning interference between the Links occurring in the other communication apparatus is acquired.

BRIEF DESCRIPTION OF THE DRAWINGS

FIG. 8 illustrates an example of Trigger Type subfield values.

FIG. 10 illustrates an example of Trigger Dependent User Info subfield.

FIG. 16 illustrates a configuration example of MLO Parameter Set Element.

MODES FOR CARRYING OUT THE INVENTION

Hereinafter, description is given of embodiments for carrying out the present technology. The description is given in the following order.
1. Configuration of Communication System
2. Concerning Inter-Link Interference
3. First Embodiment: Transmission Parameter Control Utilizing Trigger Frame
4. Second Embodiment: Transmission Parameter Control Utilizing MLO Parameter Set
5. Others <Configuration of Communication System>

Figure 1:
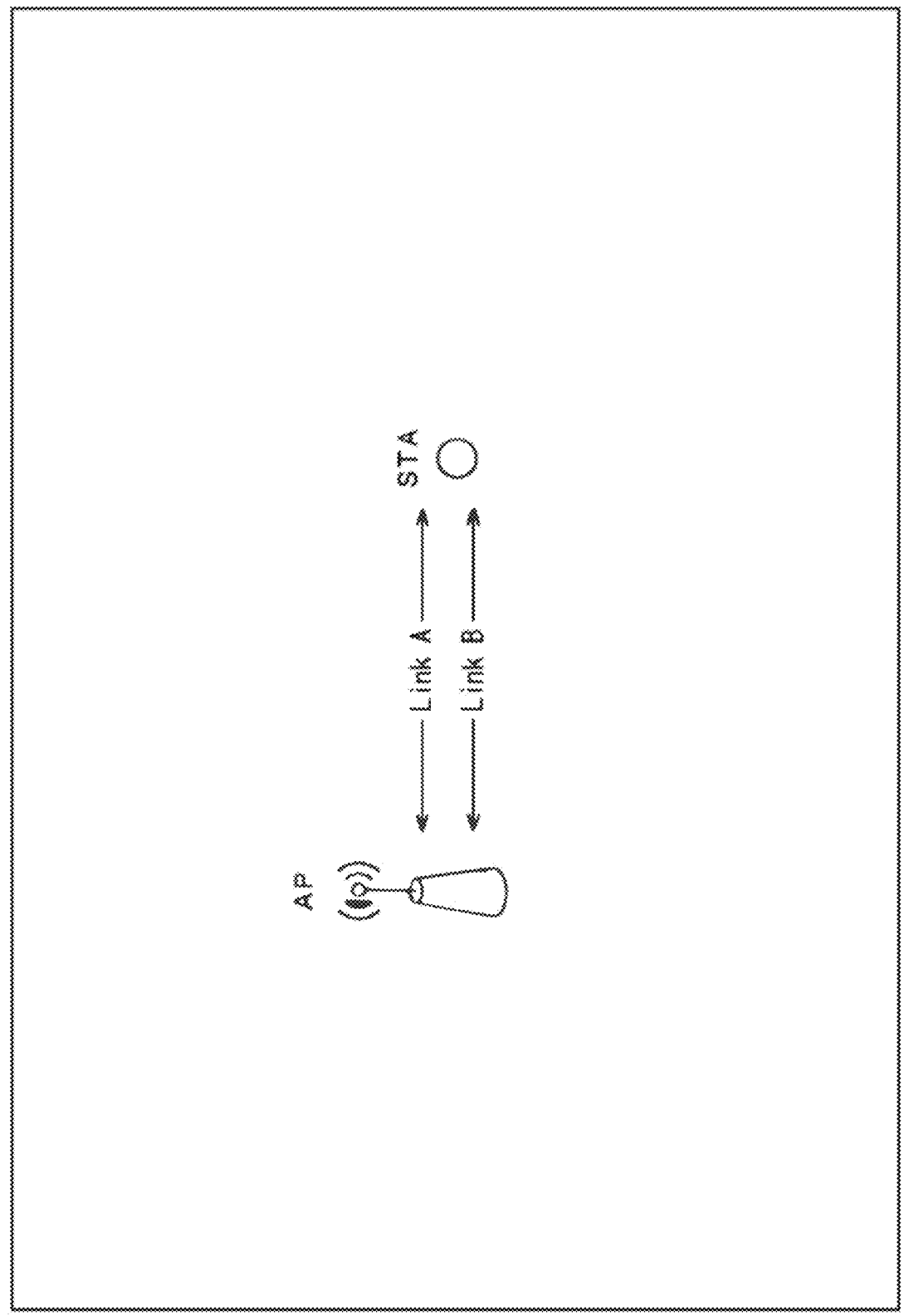
FIG. 1 illustrates a configuration example of a communication system according to an embodiment of the present technology.

FIG. 1 illustrates a configuration example of a communication system according to an embodiment of the present technology.

The communication system in FIG. 1 includes an AP (Access Point) that is a single base station, and an STA (STAtion) that is a single communication terminal operating as a slave unit. Although indicated by a circle in FIG. 1, the STA is an apparatus having a wireless communication function by means of a wireless LAN, such as a smartphone, a tablet terminal, a PC, and a TV.

As illustrated by arrows in FIG. 1, data communication between the AP and the STA is performed by MLO communication that uses a Link A and a Link B, which are a plurality of Links, simultaneously. That is, the AP and the STA are each an MLO terminal that enables the MLO communication.

The MLO communication allows, for example, DL communication from the AP to the STA and UL communication from the STA to the AP to be performed simultaneously. Data transmitted from the AP to the STA is DL DATA, and data transmitted from the STA to the AP is UL DATA.

A channel to be used as the Link A/Link B is a channel of a frequency band of one of a 920 MHz band, a 2.4 GHz band, and a 5 GHz band, which are currently allocated as unlicensed bands. A channel of another frequency band such as a 6 GHz band, which is expected to be allocated to the unlicensed band in the future, may be used as the Link A/Link B.

It may also be possible to perform the MLO communication using, as Links, channels of different bands, such as one of the Link A and the Link B being a channel of a 2.4 GHz band and the other thereof being a channel of a 5 GHz band. That is, each Link is configured by a channel of one of the bands regardless of the bands.

The MLO communication using three or more Links may be performed between the AP and the STA.

It is to be noted that the system configuration to which the present technology is directed is not limited to the configuration illustrated in FIG. 1. The present technology is applicable to a communication system of any configuration as long as there are a plurality of base stations and there are communication terminals of which coupling is established around each of the base stations. A positional relationship among the apparatuses does not matter as long as the above condition is satisfied.

Figure 2:
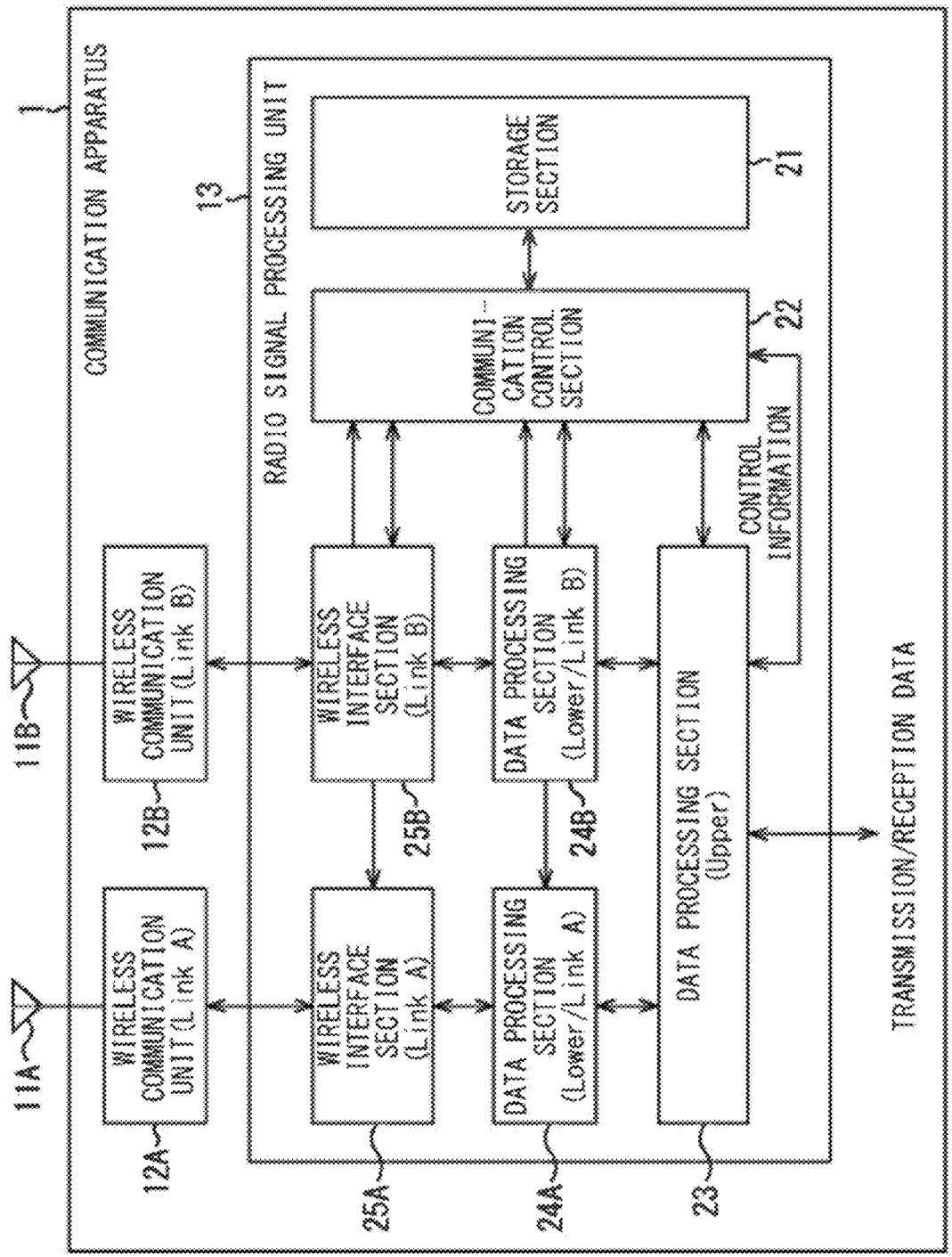
FIG. 2 is a block diagram illustrating a configuration example of a communication apparatus.

FIG. 2 is a block diagram illustrating a configuration example of a communication apparatus.

The AP and the STA in FIG. 1 are also included in a communication apparatus 1, of which a configuration is illustrated in FIG. 2. Each of the AP and the STA has the same configuration as the configuration illustrated in FIG. 2. It is to be noted that the communication apparatus 1 may be configured as a portion (e.g., a communication module, a communication chip, etc.) of an apparatus constituting the AP or the STA.

As illustrated in FIG. 2, the communication apparatus 1 includes antennas 11A and 11B, wireless communication units 12A and 12B, and a radio signal processing unit 13. The radio signal processing unit 13 includes a storage section 21, a communication control section 22, a data processing section 23, data processing sections 24A and 24B, and wireless interface sections 25A and 25B.

The storage section 21 of the radio signal processing unit 13 stores various types of information to be used by the communication control section 22. For example, inter-link interference information acquired from another communication apparatus 1 is stored in the storage section 21. The inter-link interference information is described later.

The communication control section 22 is configured, for example, as a control device of a processor such as a CPU (Central Processing Unit) and a microprocessor, and controls an overall operation of the communication apparatus 1.

For example, the communication control section 22 outputs, to the data processing section 23, control information to notify the other communication apparatus 1.

For example, in the communication control section 22 of the communication apparatus 1 that operates as the AP, a transmission parameter to be used by itself and a transmission parameter to be used in the other communication apparatus 1 are decided on the basis of inter-link interference information of itself and inter-link interference information acquired from the communication apparatus 1 operating as the STA. The control information to be outputted from the communication control section 22 to the data processing section 23 includes a transmission parameter decided in the communication control section 22.

The data processing section 23 (Upper) mainly manages sequences of transmission data supplied from the outside and information on control over the other communication apparatus 1 supplied from the communication control section 22. The data processing section 23 allocates data signals to the Links of the Link A and the Link B.

In addition, the data processing section 23 reads sequence numbers of reception signals supplied from the data processing sections 24A and 24B, and allocates reception data and control information transmitted from the other communication apparatus 1. The reception data acquired by the data processing section 23 is outputted to the outside.

The data processing sections 24A and 24B (Lower) generate transmission signals by modulating the transmission data supplied from the data processing section 23 to output the generated transmission signals, respectively, to the wireless interface sections 25A and 25B. The transmission signal of the Link A generated by the data processing section 24A is supplied to the wireless interface section 25A, and the transmission signal of the Link B generated by the data processing section 24B is supplied to the wireless interface section 25B.

In addition, the data processing sections 24A and 24B demodulate the reception signals supplied, respectively, from the wireless interface sections 25A and 25B to output reception data to the data processing section 23. The reception data demodulated by the data processing section 24A is supplied as reception data of the Link A to the data processing section 23, and the reception data demodulated by the data processing section 24B is supplied as reception data of the Link B to the data processing section 23.

The wireless interface sections 25A and 25B perform D/A conversion on the transmission signals supplied, respectively, from the data processing sections 24A and 24B to thereby convert digital signals into analog signals. The wireless interface sections 25A and 25B output transmission analog signals obtained by performing the D/A conversion, respectively, to the wireless communication units 12A and 12B.

In addition, the wireless interface sections 25A and 25B perform A/D conversion on reception signals supplied, respectively, from the wireless communication units 12A and 12B to thereby convert analog signals into digital signals. The wireless interface sections 25A and 25B output, as the reception signals, the digital signals obtained by performing the A/D conversion to the data processing sections 24A and 24B.

The wireless communication units 12A and 12B perform RF processing on the transmission analog signals supplied from the wireless interface sections 25A and 25B to transmit, as radio signals, the transmission analog signals from the antennas 11A and 11B.

In addition, the wireless communication units 12A and 12B perform RF processing on the radio signals supplied from the antennas 11A and 11B to thereby generate reception analog signals, and output the generated reception analog signals to the wireless interface sections 25A and 25B.

The radio signal processing unit 13 is implemented, for example, by one IC. All processing sections included in the radio signal processing unit 13 may be implemented by a plurality of ICs, instead of being implemented by one IC. For example, the wireless interface sections 25A and 25B may be implemented by an IC different from an IC including another processing section.

<<Concerning Inter-Link Interference>>

Figure 3:
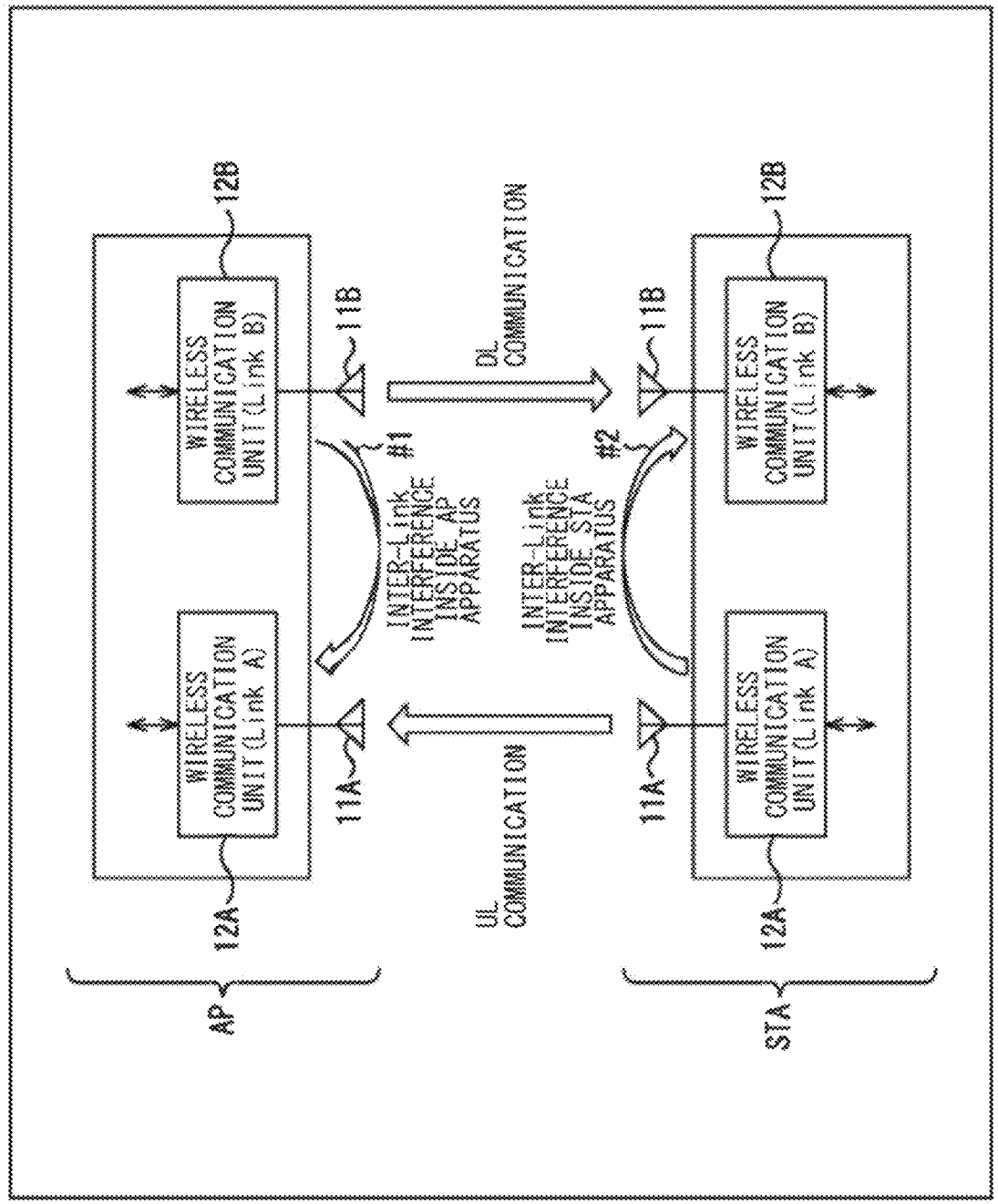
FIG. 3 describes inter-link interference.

FIG. 3 describes the inter-link interference.

Here, it is assumed that each of the AP and the STA performs data communication using two Links of the Link A and the Link B.

In a case where the AP uses both the Links of the Link A and the Link B for transmission of DL DATA to the STA, the inter-link interference is not a major issue.

Meanwhile, in a case where the AP receives UL DATA using the Link A and transmits DL DATA using the Link B, a signal transmitted from the wireless communication unit 12B of the AP may sometimes cause inter-link interference to the wireless communication unit 12A, as indicated by an arrow #1. In this case, the quality of a reception signal of the UL DATA in the wireless communication unit 12A is deteriorated.

Likewise, in a case where the STA uses both the Links of the Link A and the Link B for transmission of the UL DATA to the AP, the inter-link interference is not a major issue.

Meanwhile, in a case where the STA receives DL DATA using the Link B and transmits the UL DATA using the Link A, a signal transmitted from the wireless communication unit 12A of the STA may sometimes cause inter-link interference to the wireless communication unit 12B, as indicated by an arrow #2. In this case, the quality of a reception signal of the DL DATA in the wireless communication unit 12B is deteriorated.

In a case where such inter-link interference occurs in the apparatus, sometimes it may not be possible to perform an STR operation which is an operation of performing transmission and reception simultaneously using a plurality of Links.

Here, for example, when the AP lowers transmission power of the Link B, the inter-link interference inside the AP with the Link A is reduced. In addition, changing a modulation scheme of the UL communication to be used in the STA or lowering an encoding rate thereof (changing MCS) enhances the possibility of being able to receive and demodulate signals of the UL communication in the AP even in a situation where the inter-link interference inside the AP occurs.

In this manner, when a transmission parameter of each Link is able to be correctly set in each MLO terminal, it becomes possible to reduce the inter-link interference in both of the AP and the STA and thus to normally perform the STR operation. It is to be noted that the transmission parameter includes a transmission power value, the MCS, and the like.

As described later, in the communication system in FIG. 1, an exchange is performed in order for each MLO terminal to correctly set a transmission parameter of each Link.

Figure 4:
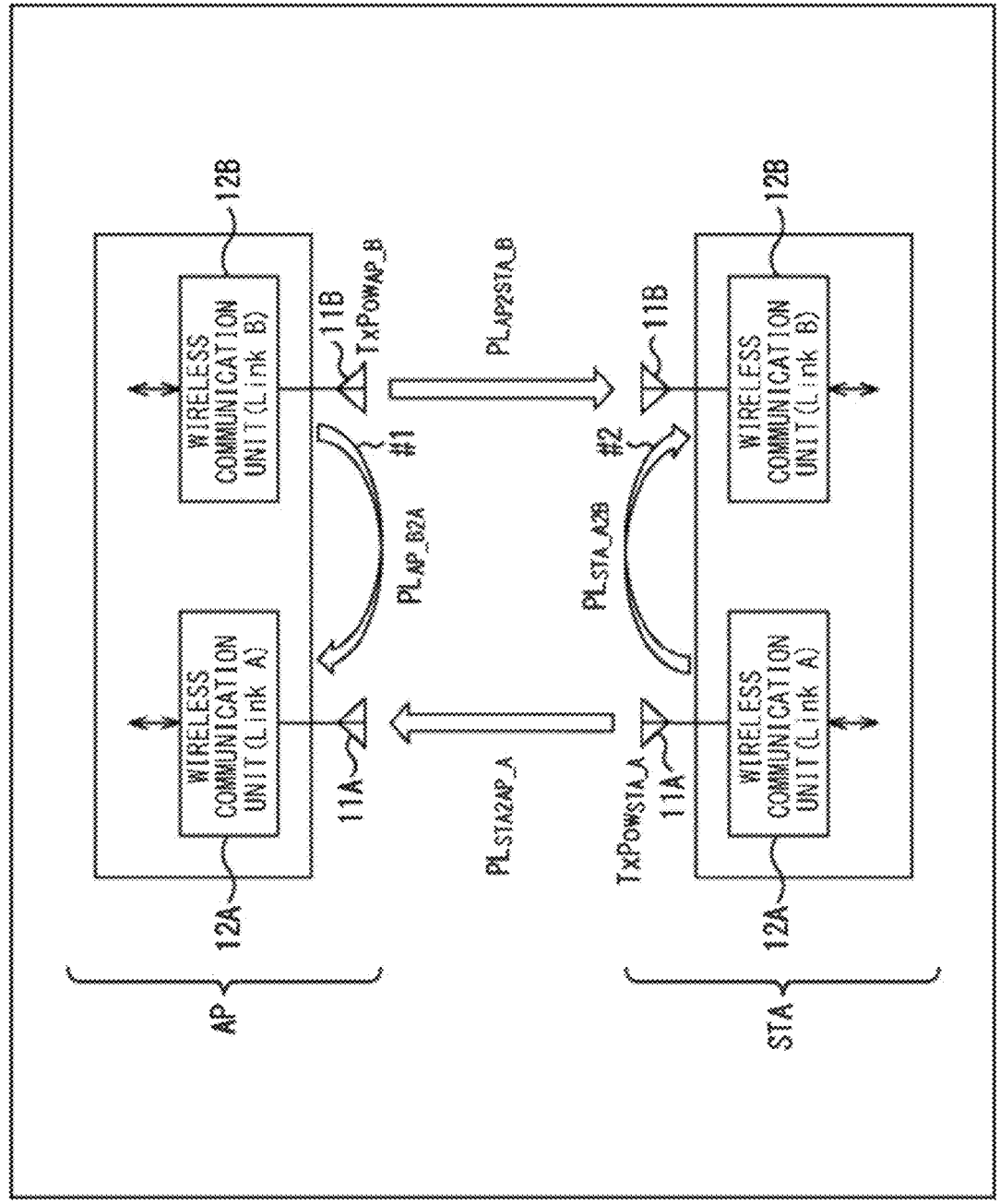
FIG. 4 illustrates an example of parameters representing characteristics of MLO communication.

FIG. 4 illustrates an example of parameters representing characteristics of the MLO communication.

In a case where the UL communication is performed using the Link A and the DL communication is performed using the Link B, the MLO communication is represented by six parameters of $TxPow_{AP\_B}$, $PL_{AP\_B2A}$, $PL_{AP2STA\_B}$, $TXPOW_{STA\_A}$, $PL_{STA\_A2B}$, and $PL_{AP2STA\_A}$, as illustrated in FIG. 4. The parameters represent the following contents.

$TxPow_{AP\_B}$: transmission power (dBm) of the Link B in the AP $PL_{AP\_B2A}$: propagation loss (dB) of the inter-link interference from the Link B to the Link A of the AP $PL_{AP2STA\_B}$: propagation loss (dB) in the Link B between the AP and the STA $TxPow_{STA\_A}$: transmission power (dBm) of the Link A in the STA $PL_{STA\_A2B}$: propagation loss (dB) of the inter-link interference from the Link A to the Link B of the STA $PL_{AP2STA\_A}$: propagation loss (dB) in the Link A between the AP and the STA Conversely, in a case where the DL communication is performed using the Link A and the UL communication is performed using the Link B, the MLO communication is represented by six parameters of $TxPow_{AP\_A}$, $PL_{AP\_A2B}$, $PL_{AP2STA\_A}$, $TxPow_{STA\_B}$, $PL_{STA\_B2A}$, and $PL_{AP2STA\_B}$. The parameters represent the following contents.

$TxPow_{AP\_A}$: transmission power (dBm) of the Link A in the AP $PL_{AP\_A2B}$: propagation loss (dB) of the inter-link interference from the Link A to the Link B of the AP $PL_{AP2STA\_A}$: propagation loss (dB) in the Link A between the AP and the STA $TxPow_{STA\_B}$: transmission power (dBm) of the Link B in the STA $PL_{STA\_B2A}$: propagation loss (dB) of the inter-link interference from the Link B to the Link A of the STA $PL_{AP2STA\_B}$: propagation loss (dB) in the Link B between the AP and the STA In a case where the MLO communication illustrated in FIGS. 3 and 4 is performed, SIR (Signal-to-Interference Ratio) of each of the Link A in the AP and the Link B in the STA, which is one index of reception quality, is represented by the following expressions (1) and (2).

$$SIR_{AP\_A}=(TxPow_{STA\_A}-PL_{STA2AP\_A})-(TxPow_{AP\_B}-PL_{AP\_B2A}) \quad (1)$$

$$SIR_{STA\_B}=(TXPow_{AP\_B}-PL_{AP2STA\_B})-(TxPow_{STA\_A}-PL_{STA\_A2B}) \quad (2)$$

In addition, when TxPow which is a transmission parameter is removed from the expressions (1) and (2), the following expression (3) is obtained.

$$SIR_{AP\_A}+SIR_{STA\_B}=PL_{AP\_B2A}+PL_{STA\_A2B}-PL_{STA2AP\_A}-PL_{AP2STA\_B} \quad (3)$$

Accordingly, when a value of each variable on right side of the expression (3) is known, it may be possible to obtain the sum of the SIR of the Link A in the AP and the SIR of the Link B in the STA.

By utilizing the above, for example, the AP, which is one of the AP and the STA, decides transmission parameters of both of the AP and the STA by procedures described below.

Procedure 1: the expression (3) is utilized to decide each target SIR of the AP and the STA.

Procedure 2: the expressions (1) and (2) are utilized to decide $TxPow_{AP\_n}$ and $TxPow_{STA\_A}$.

Procedure 3: an optimum MCS of the Link B to be used by the AP and an optimal MCS of the Link A to be used by the STA are decided from the target SIR.

The targeted SIR of the procedure (1) is the sum of the SIR of the Link A in the AP and the SIR of the Link B in the STA. The target SIR needs to be equivalent to the value ($SIR_{AP\_A}+SIR_{STA\_B}$) obtained by the expression (3), or needs to be equal to or less than the value obtained by the expression (3).

The target SIR of each of the AP and the STA is decided, for example, by setting one of the SIR values in advance and obtaining the other SIR value from the expression (3). The sum of the SIRs of the AP and the STA may be simply bisected to thereby decide the target SIR of each of the AP and the STA.

It may also be possible to adopt a control not to perform the STR operation in a case where a result obtained by the expression (3) is not a sufficient value.

It is to be noted that calculation is performed using SINR with Noise being added, instead of the SIRs of the above expressions (1) to (3), to thereby enable the transmission parameter to be decided more accurately. In this case, a Noise amount of each Link of the AP and the STA is measured in advance, and each expression is calculated using the Noise amount. In a case where Noise is small as compared with a degree of interference, it becomes possible to obtain an accurate transmission parameter also by using the SIR.

From those described above, one of the AP and the STA is able to decide a transmission parameter to be used for the STR operation when the propagation loss of each of the Link A and the Link B and the propagation loss of the inter-link interference in each of the AP and the STA are known.

The propagation loss of each of the Link A and the Link B is able to be obtained using existing protocols such as Measurement and Sounding.

Meanwhile, the propagation loss of the inter-link interference in each of the AP and the STA needs to be newly notified (transmitted and received) as a communication parameter.

In addition, a mechanism is necessary to notify a transmission parameter decided by one to the other.

Hereinafter, description is given of the following two methods in order as methods for controlling a transmission parameter upon STR operation including the notification of the propagation loss of the inter-link interference.

First Embodiment: Transmission Parameter Control Utilizing Trigger Frame

Second Embodiment: Transmission Parameter Control Utilizing MLO Parameter Set

First Embodiment: Transmission Parameter Control Utilizing Trigger Frame

<Example of Sequence>

Figure 5:
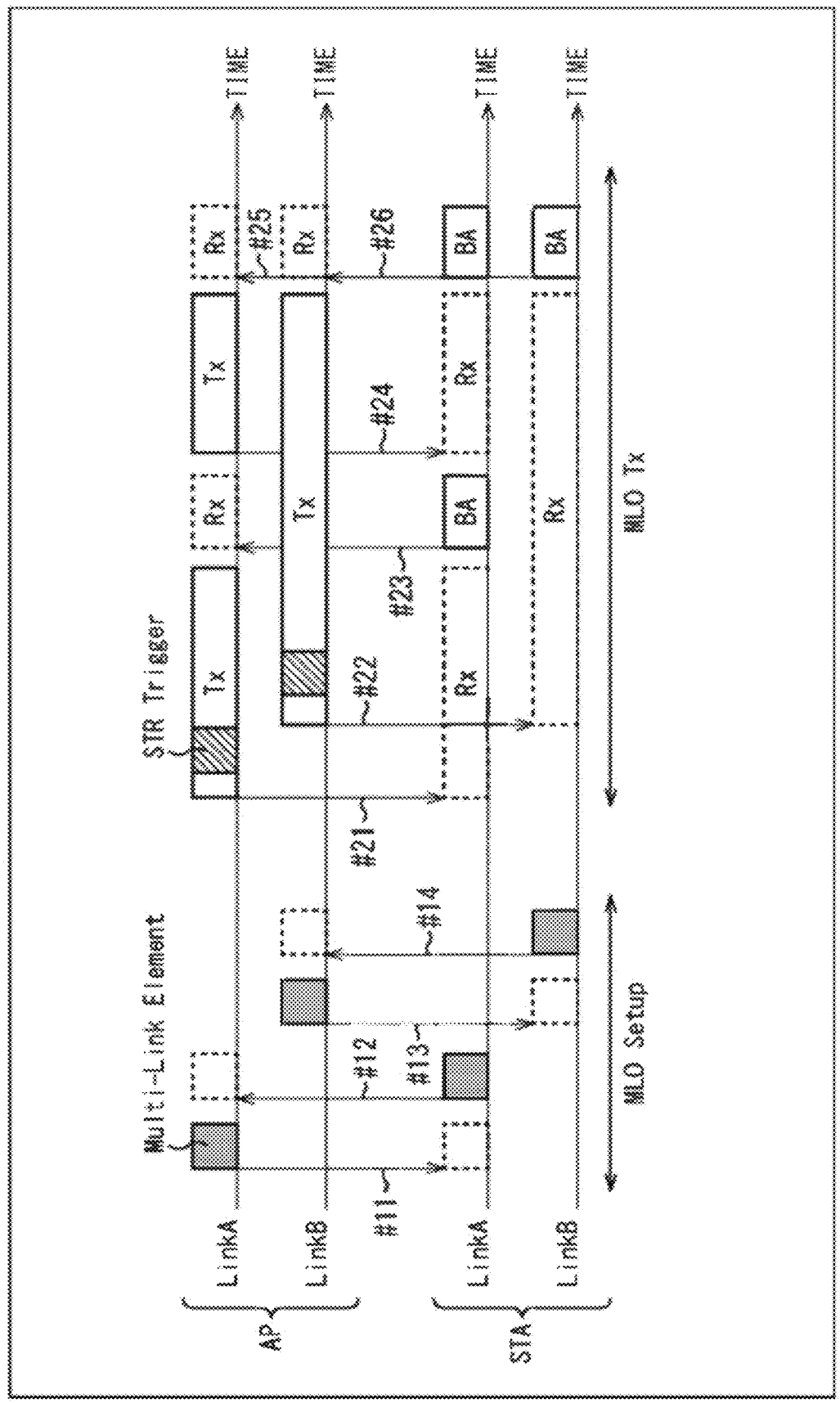
FIG. 5 illustrates a sequence in transmission parameter control utilizing Trigger Frame.

FIG. 5 illustrates a sequence in transmission parameter control utilizing Trigger Frame.

FIG. 5 illustrates, on upper side, contents of transmission and reception of each of the Link A and the Link B in the AP, and illustrates, on lower side, contents of transmission and reception of each of the Link A and the Link B in the STA. The same applies also to FIGS. 13 and 15 described later.

As illustrated by bidirectional arrows in the lower part of FIG. 5, the transmission parameter control utilizing the Trigger Frame is configured by two phases of MLO Setup Phase and MLO Tx Phase.

MLO Setup Phase

In the MLO Setup Phase, exchange of Multi-Link Element between the AP and the STA is performed. The Multi-Link Element includes the inter-link interference information which is information representing power of the inter-link interference.

The Multi-Link Element is Element to be used by the MLO terminal to notify Capability information of the MLO. The Capability information includes information concerning the MLO by the wireless communication units 12A and 12B.

The Multi-Link Element is transmitted using a predetermined frame such as Beacon Frame, DMG Beacon Frame, (Re)Association Request Frame, (Re)Association Response Frame, and Probe Response Frame. The Beacon Frame and the DMG Beacon Frame are each a notification signal. In addition, the (Re)Association Request Frame, the (Re)Association Response Frame. and the Probe Response Frame are signals to be used upon coupling.

In the example of FIG. 5, as indicated by an arrow #11, the Multi-Link Element including the inter-link interference information of the Link A in the AP is transmitted from the AP to the STA using the Link A. The inter-link interference information of the Link A transmitted from the AP using the Link A represents power of the inter-link interference received by the Link A from the Link B in the AP.

In addition, as indicated by an arrow #12, the Multi-Link Element including the inter-link interference information in the STA is transmitted from the STA to the AP using the Link A. The inter-link interference information of the Link A transmitted from the STA using the Link A represents power of the inter-link interference received by the Link A from the Link B in the STA.

As indicated by an arrow #13, the Multi-Link Element including the inter-link interference information of the Link B in the AP is transmitted from the AP to the STA using the Link B. The inter-link interference information of the Link B transmitted from the AP using the Link B represents power of the inter-link interference received by the Link B from the Link A in the AP.

As indicated by an arrow #14, the Multi-Link Element including the inter-link interference information of the Link B in the STA is transmitted from the STA to the AP using the Link B. The inter-link interference information of the Link B transmitted from the STA using the Link B represents power of the inter-link interference received by the Link B from the Link A in the STA.

Exchanging the Multi-Link Elements enables the AP and the STA to share the inter-link interference information with each other.

It is to be noted that one frame may include a plurality of Multi-Link Elements. In this case, the plurality of Multi-Link Elements are described in the frame to be arranged in a predetermined order. The plurality of Multi-Link Elements include pieces of BSS information (band, channel, BSSID, etc.) each including the inter-link interference information of a different Link.

For example, in a case where the AP transmits a frame including the plurality of Multi-Link Elements using a certain Link, it may be possible for the STA to attempt coupling through a Link different from the Link used for the transmission of the frame on the basis of the BSS information by referring to the Multi-Link Elements described in the frame in order from the head.

In addition, on the basis of the inter-link interference information of itself, the STA may attempt coupling by referring, in the order of Links not influenced by the inter-link interference, to the Multi-Link Elements including the BSS information of the Links.

That is, the STA may select, in an arbitrary order, the Multi-Link Elements including the BSS information of a Link different from the Link used for the transmission of the frame to attempt coupling to the AP on the basis of the BSS information described in the selected Multi-Link Element.

Meanwhile, the AP is able to transmit a frame including the plurality of Multi-Link Elements by arranging the Multi-Link Elements in the order of Links not influenced by the inter-link interference on the basis of the inter-link interference information of itself. The Multi-Link Element including the BSS information of a Link least influenced by the inter-link interference is described at the head of the arrangement of the plurality of the Multi-Link Elements. Sorting of the Multi-Link Elements is performed, for example, under the control of the communication control section 22 of the AP.

In a case where the AP controls the whole, i.e., in a case where the AP decides both of the transmission parameter of the AP and the transmission parameter of the STA, the inter-link interference information of the AP may not be included in the Multi-Link Element to be transmitted by the AP. In this case, the inter-link interference information of the AP is not notified to the STA.

It is to be noted that the inter-link interference information may not be defined as information inside the element. For example, the inter-link interference information may be defined as information included in one of Control Frame, Action Frame, and Management Frame. That is, it may be possible to include the inter-link interference information in various types of information transmitted and received between the AP and the STA.

MLO Tx Phase

In the MLO Tx Phase, the two Links of the Link A and the Link B are used to transmit and receive data between the AP and the STA.

At this time, the AP causes STR Trigger Frame to be included in the transmission data, and notifies the STA of the transmission parameter of the STA upon the STR operation. The STR Trigger Frame is used by the AP to notify the STA of the transmission parameter of the STA.

In the example of FIG. 5, as indicated by an arrow #21, the transmission data including the STR Trigger Frame is transmitted from the AP to the STA using the Link A. The STR Trigger Frame transmitted using the Link A includes a transmission parameter to be used in a case where the STA transmits transmission data to the AP using the Link A.

In addition, as indicated by an arrow #22, the transmission data including the STR Trigger Frame is transmitted from the AP to the STA using the Link B. The STR Trigger Frame transmitted using the Link B includes a transmission parameter to be used in a case where the STA transmits transmission data to the AP using the Link B.

It is to be noted that the transmission data includes PPDU (PLCP Protocol Data Unit) in which PHY Header is added to each head of a plurality of Frames including the STR Trigger Frame. In FIG. 5, a lump of transmission data illustrated in a band shape represents one PPDU. The STR Trigger Frame is disposed in a hatched portion of the PPDU.

After the STR Trigger Frame is transmitted from the AP to the STA using the Link A, a Block Ack (BA) is transmitted from the STA to the AP using the Link A, as indicated by an arrow #23. The transmission of the Block Ack is performed using the transmission parameter included in the STR Trigger Frame. The STR Trigger Frame transmitted from the AP to the STA includes a transmission parameter, and serves as an induction signal to cause the STA to induce transmission of the BA using a transmission parameter notified by the STR Trigger Frame.

After the Block Ack is transmitted from the STA to the AP using the Link A, the transmission data is transmitted from the AP to the STA using the Link A, as indicated by an arrow #24.

In FIG. 5, after the transmission of the data from the AP to the STA, the Block Ack is transmitted from the STA to the AP using the Link A and the Link B as indicated by arrows #25 and #26. The STA is also able to transmit data other than the Block Ack to the AP when the AP permits. For example, in a case where the transmission of data is permitted by the Trigger Frame, the STA is able to start transmission of the UL DATA using the transmission parameter for the STR operation.

In addition, in FIG. 5, the AP performs a carrier sense operation specified by an IEEE 802.11 standard using the Link B while receiving the inter-link interference from the Link A to be able to detect another signal. As described later, the AP decides transmission power of the Link A to reduce the inter-link interference to the Link B, and performs a carrier sense operation using the Link B.

<Example of Frame Format>
Data Structure of Multi-Link Element

Figure 6:
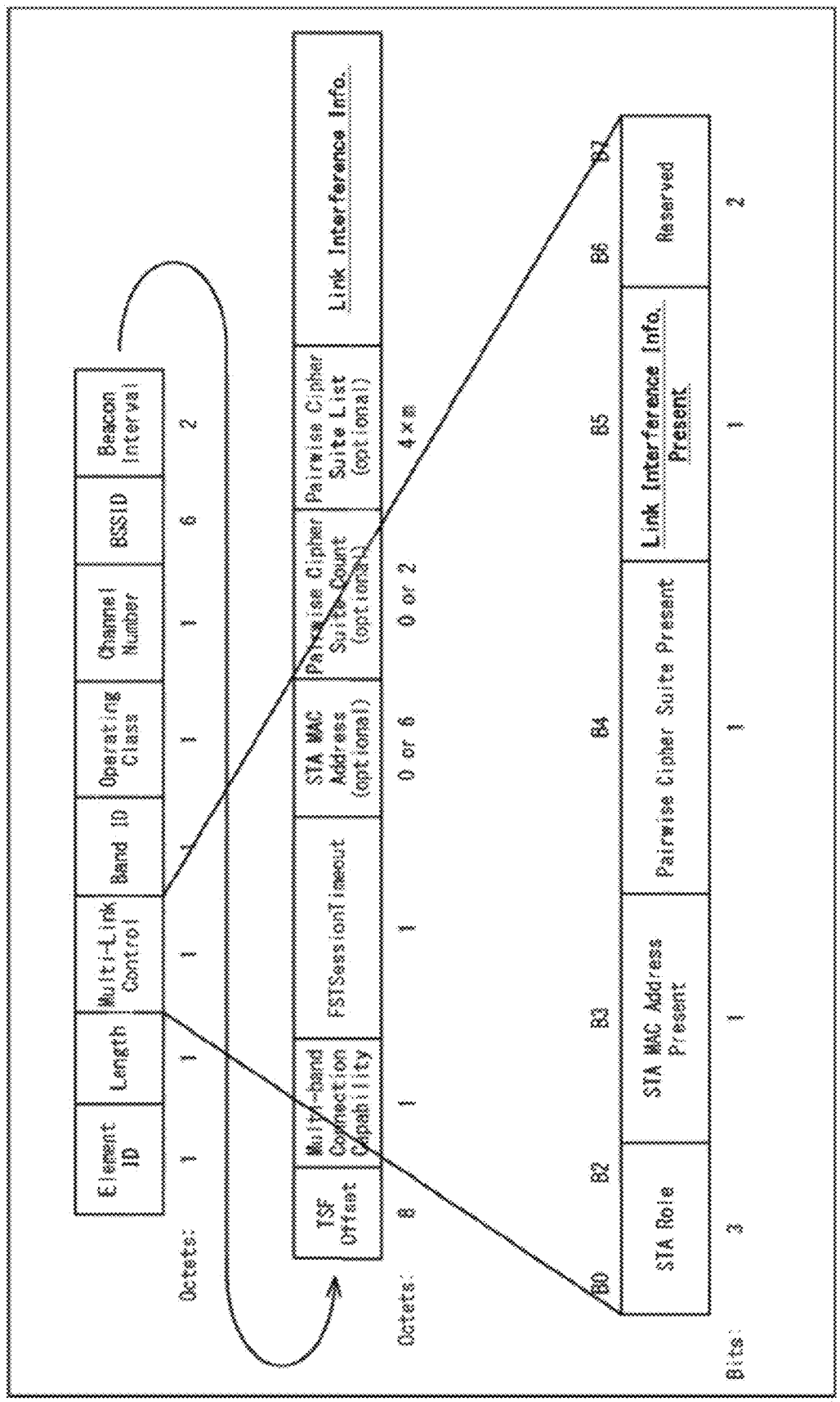
FIG. 6 illustrates an example of a data structure of Multi-Link Element.

FIG. 6 illustrates an example of a data structures of the Multi-Link Element to be used in the MLO Setup Phase.

The Multi-Link Element has a Multi-Band Element-based data structure defined in IEEE 802 11-2016. At the head of the Multi-Link Element, there is described an Element ID indicating the Multi-Link Element.

In a Multi-Link Control field, a Link Interference Info. Present subfield is defined as illustrated on lower side of FIG. 6. In addition, Link Interference Info. is defined at the end of the Multi-Link Element as illustrated on middle side of FIG. 6.

The Link Interference Info. Present subfield indicates whether or not the Link Interference Info. is included in the Multi-Link Element.

For example, a value of the Link Interference Info. Present subfield being one indicates that the Link Interference Info. is included in the Multi-Link Element. Meanwhile, a value of the Link Interference Info. Present subfield being zero indicates that the Link Interference Info. is not included in the Multi-Link Element.

The Link Interference Info. is the inter-link interference information (Link Interference Level) described above.

The inter-link interference information indicates power of the inter-link interference in the STA received by the Link B in a case where signal transmission is performed from the STA to the AP at a maximum transmission power using, for example, the Link A specified by Band ID, Operating Class, or Channel Number inside the Multi-Link Element. The power indicated by the Link Interference Info. is represented, for example, as a binary integer in a unit of dBm.

In addition, in a case where the power indicated by the Link Interference Info. is zero, this indicates that the STR operation in the STA is possible without the need of controlling the transmission parameter of the STA from the AP. Meanwhile, in a case where the Link Interference Info. is 255 (the maximum value in 8-bit representation), this indicates that the STR operation in the STA is not possible.

It is to be noted that the data structure of the Multi-Link Element is not limited to the data structure illustrated in FIG. 6. It may be possible to employ, as the data structure of the Multi-Link Element, various structures including frequency information (including bands and channels) of another Link and the inter-link interference information.

For example, it may be possible to employ, as the data structure of the Multi-Link Element, a structure including a Band ID or a Channel Number of start/end of a frequency band and describing inter-link interference information common to a certain frequency band zone (such as W52/53 or W56 at the maximum).

As for the inter-link interference information as well, the power may be represented in a hierarchical unit instead of being represented in an integer unit.

A field indicating that the STR operation is not possible may be provided separately from a Geld of the inter-link interference information. When each field of the BSS information, the frequency information, and the inter-link interference information is included, no other field may be provided in the Multi-Link Element.

Data Structure of STR Trigger Frame

Figure 7:
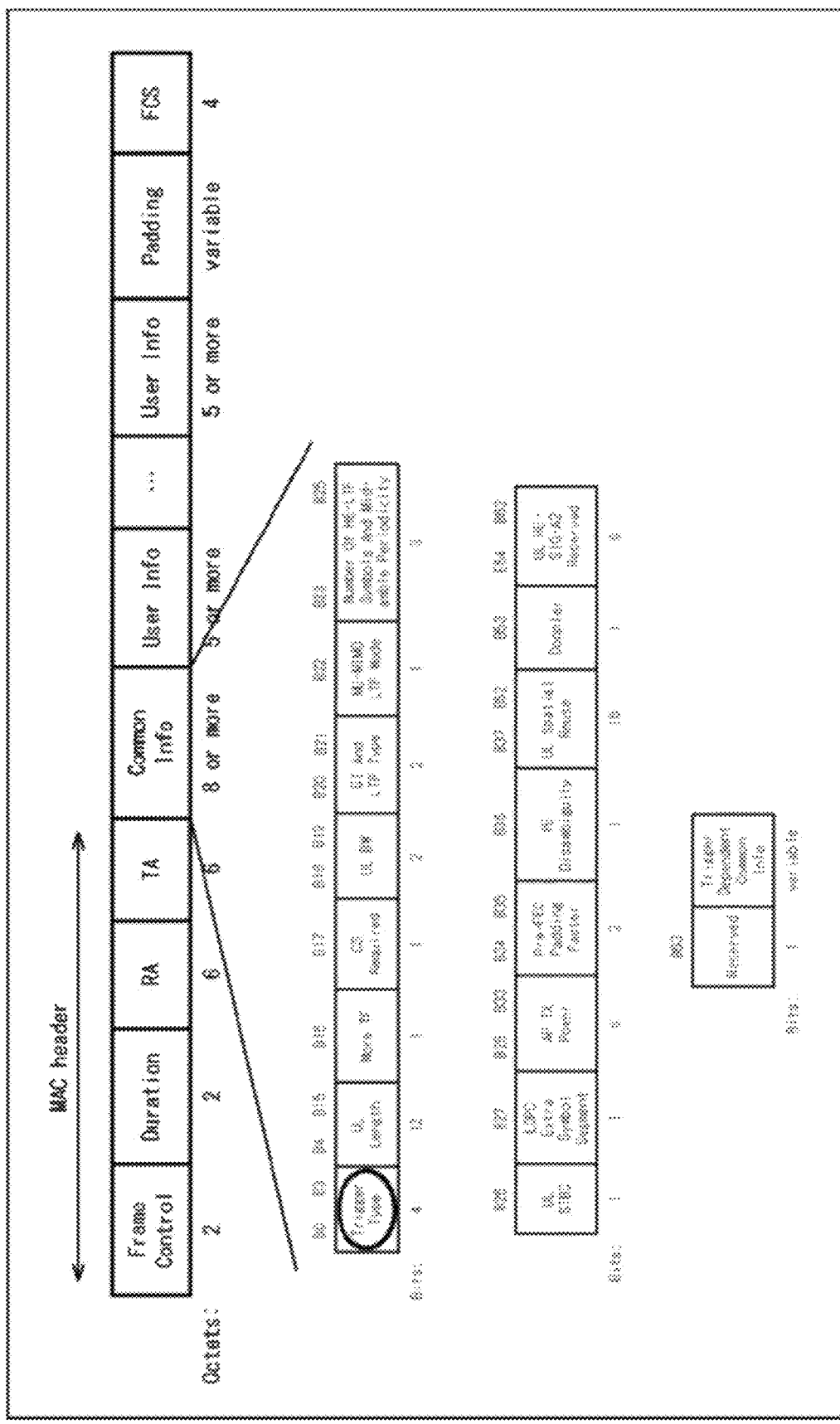
FIG. 7 illustrates an example of a data structure of STR Trigger Frame.

FIG. 7 illustrates an example of a data structure of the STR Trigger Frame to be used in the MLO Tx Phase.

The STR Trigger Frame has a data structure based on the Trigger Frame defined in P802.11ax_D4.0. At the head of the STR Trigger Frame, a MAC header including Frame Control is disposed.

At the head of a Common Info field subsequent to the MAC header, Trigger Type is described as illustrated as being encircled on middle side of FIG. 7. The STR Trigger is defined as new Trigger Type in the Trigger Type. In addition, STR MCS and STR Target RSSI are newly defined in Trigger Dependent User Info in a User Info field.

FIG. 8 illustrates an example of Trigger Type subfield values.

As illustrated as being underlined in FIG. 8, Trigger Type subfield value=8 is defined as a value indicating the STR Trigger.

Figure 9:
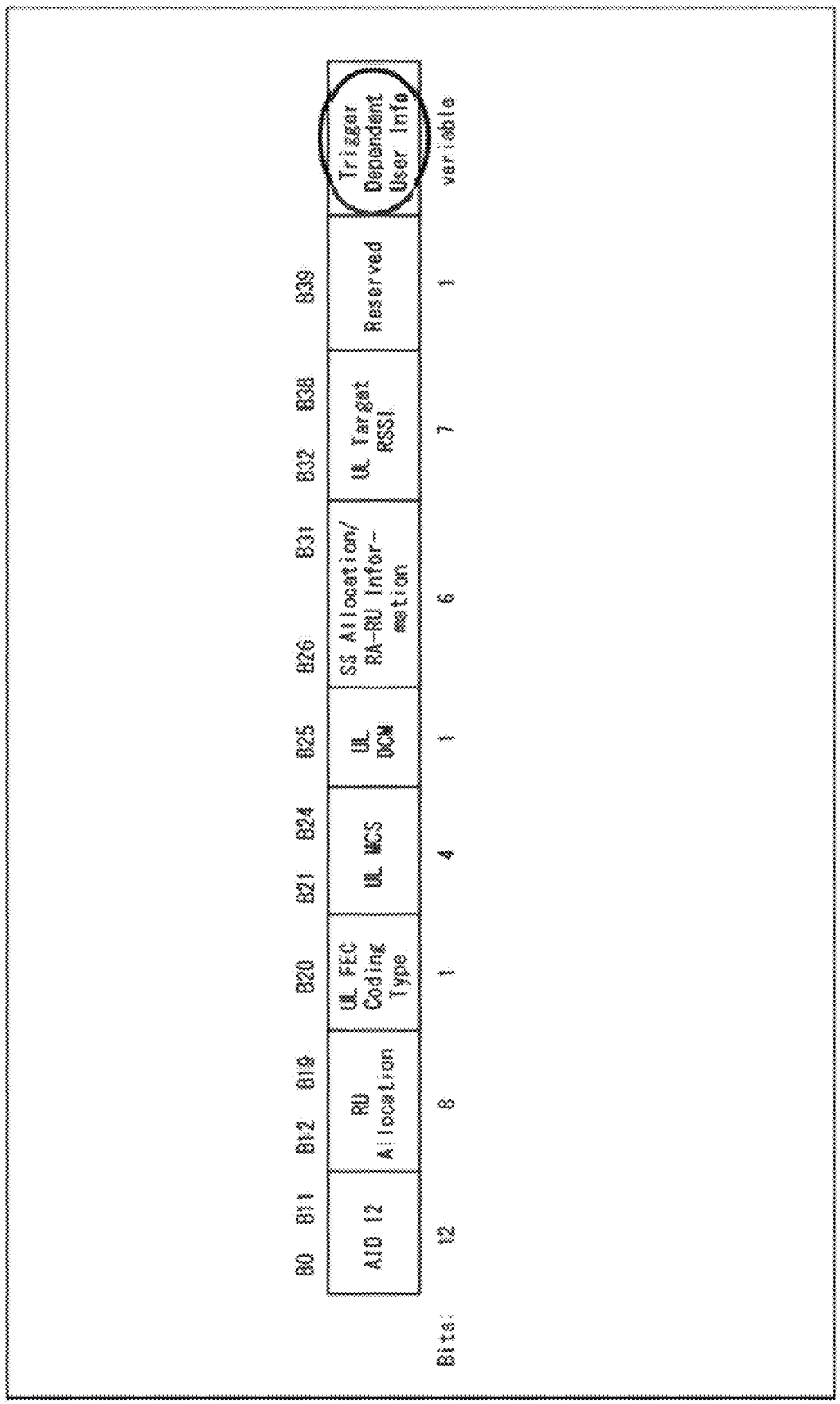
FIG. 9 illustrates an example of User Info field of STR Trigger Frame.

FIG. 9 illustrates an example of the User Info field of the STR Trigger Frame.

At the end of the User Info field, the Trigger Dependent User Info is described as illustrated as being encircled. As described above, the STR MCS and the STR Target RSSI are included in the Trigger Dependent User Info. Other subfields in the User Info field are the same as those defined in P802 11ax.

Figure 10:
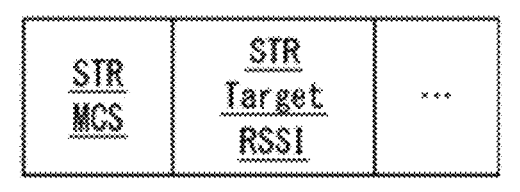

FIG. 10 illustrates an example of subfields included in a Trigger Dependent User Info subfield in the STR Trigger Frame.

As illustrated in FIG. 10, an STR MCS subfield and an STR Target RSSI subfield are defined in the Trigger Dependent User Info subfield.

The STR MCS is described in the STR MCS subfield. The STR MCS represents MCS information on EHT TB PPDU as information concerning a modulation scheme to be used in performing the STR operation.

The STR Target RSSI is described in the STR Target RSSI subfield. The STR Target RSSI represents an expected average received power value of EHT TB PPDU at an antenna terminal point of the AP in performing the STR operation. In other words, the STR Target RSSI is information that specifies transmission power of the STA. The resolution of the expected power value is in a unit of 1 dB. The detail of the expected average received power value of the EHT TB PPDU is specified in the P802.11 ax_D4.0.

The STR Trigger Frame having the above-described data structure is used to notify a transmission parameter to be used in performing the STR operation. Meanwhile, in a case where no STR operation is performed, a transmission parameter of the EHT TB PPDU is notified using the User Info field as in the existing manner. The STR Trigger Frame also includes a transmission parameter to be used in a case where no STR operation is performed.

Causing the STR Trigger Frame to include the transmission parameter in a case of performing the STR operation as well as the transmission parameter in a case of performing no STR operation eliminates the necessity for the AP to determine in advance whether or not to perform the STR operation and to change a description content of the frame in response to a result of the determination.

It is to be noted that the information included in the Trigger Dependent User Info is not limited to the above two types of information. For example, other parameters such as FEC and DCM may be newly defined as transmission parameters for the STR operation and may be included in the Trigger Dependent User Info.

In addition, as for Length, CS Required, BW, and the like included in the Common Info field (FIG. 7) as well, the transmission parameter for the STR operation may be included in Trigger Dependent Common Info. For example, in a case where a transmission parameter to be used when the STA transmits the Block Ack is notified in the STR Trigger Frame, a parameter notified by an MU-BAR variant, in addition to the STR MCS and the STR Target RSSI described above, may be included in the STR Trigger Frame.

In addition, the STR MCS and the STR Target RSSI may be included, for example, in a TRS Control field defined in the P802.11ax_D4.0.

<Operation of Each Apparatus>

Here, description is given of operations of the AP and the STA at the time of transmission parameter control utilizing the Trigger Frame.

Figure 11:
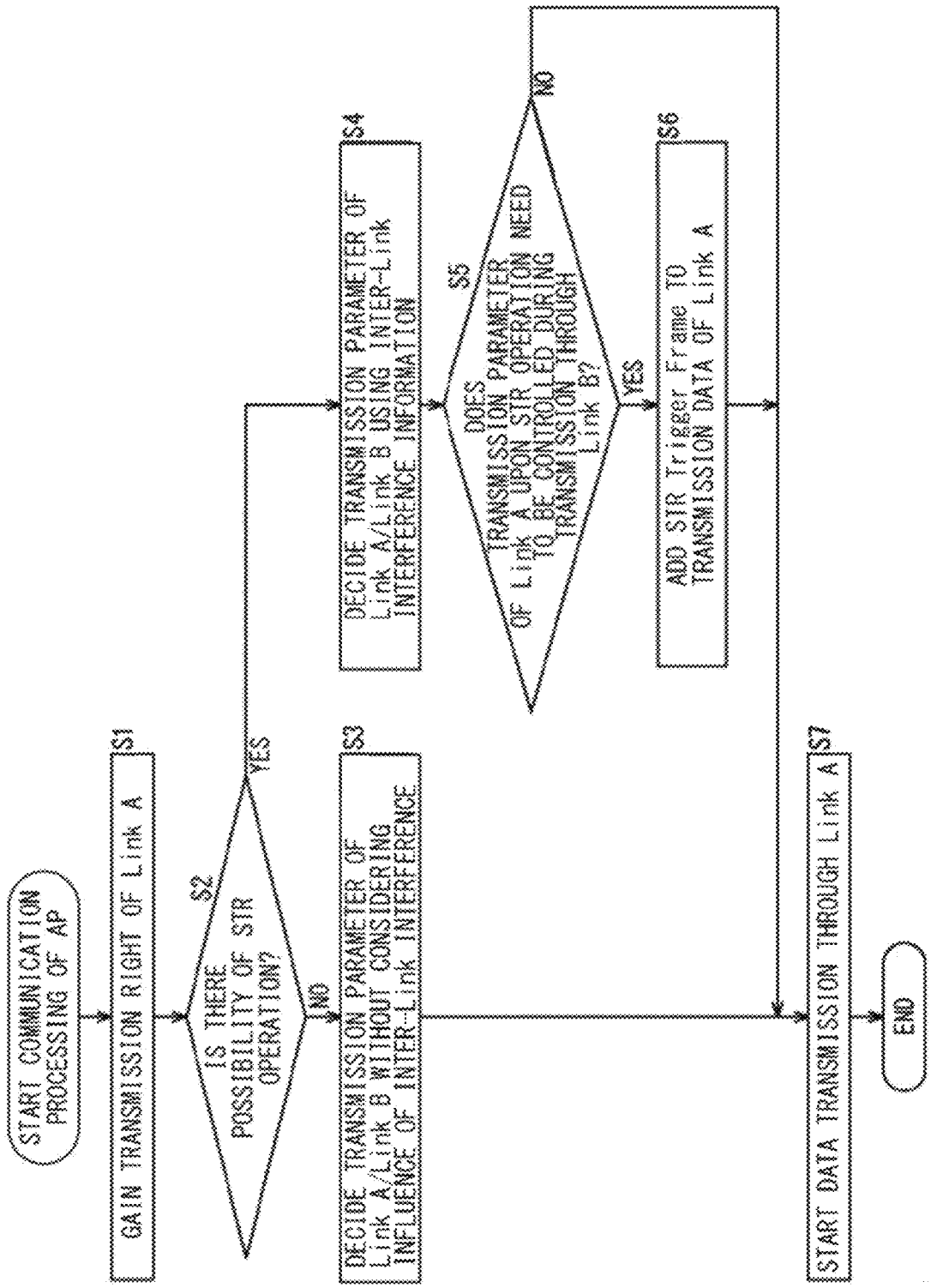
FIG. 11 is a flowchart that describes communication processing of an AP.
Figure 12:
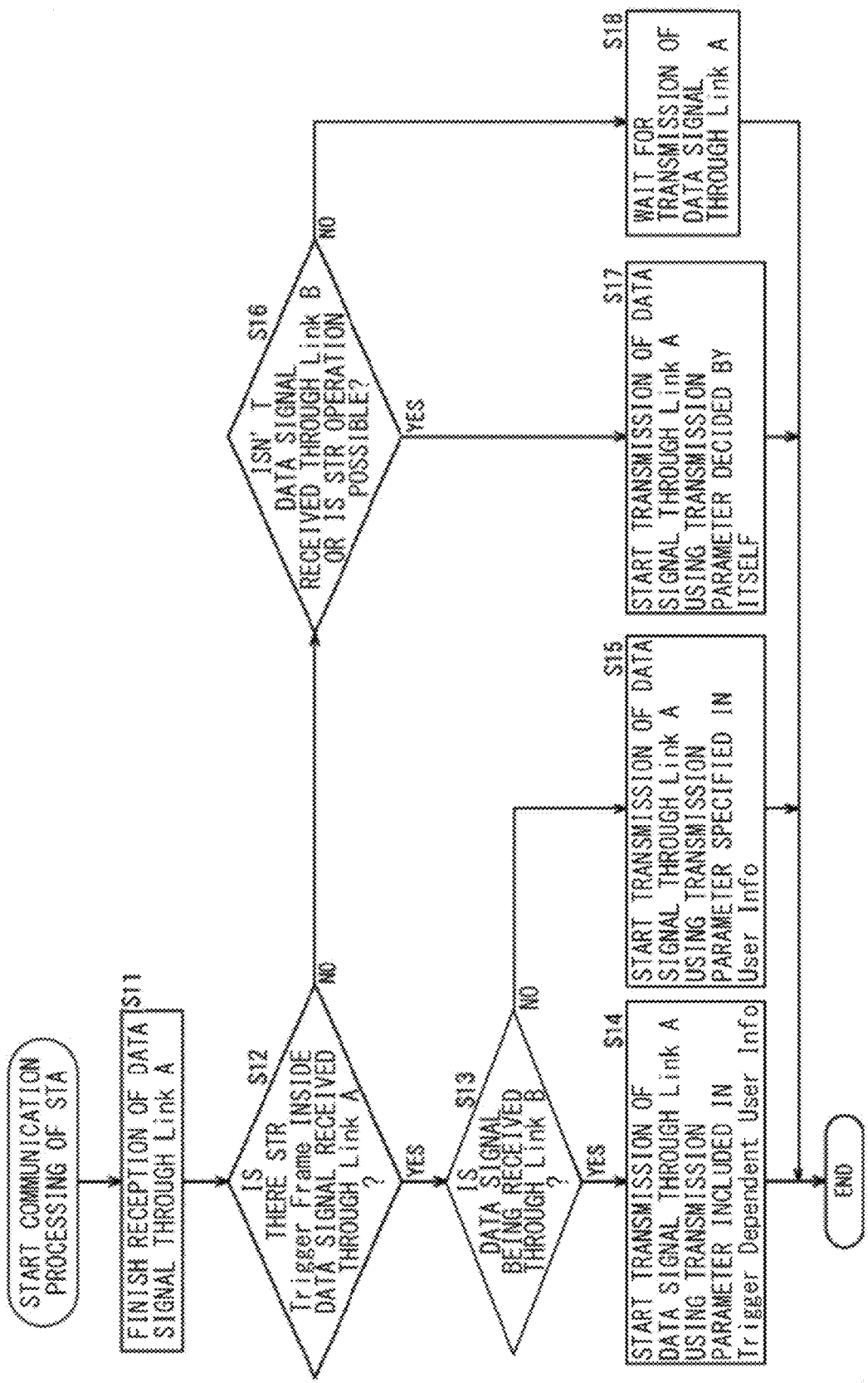
FIG. 12 is a flowchart that describes communication processing of an STA.

Pieces of processing illustrated in FIGS. 11 and 12 are pieces of processing of the AP and the STA in the MLO Tx Phase. Performing the MLO Setup Phase allows the inter-link interference information to be shared with each other between the AP and the STA.

Operation of AP

First, description is given of communication processing of the AP with reference to a flowchart in FIG. 11.

In step S1, the communication control section 22 of the AP gains a transmission right of the Link A, for example.

In step S2, the communication control section 22 of the AP determines whether or not there is a possibility of performing the STR operation.

For example, determination is made as to whether or not there is a possibility of performing the STR operation on the basis of whether or not the Link B is in a Busy state (whether or not NAV Timer is set) until the end of transmission through the Link A of which the transmission right has been gained. In a case where the Link B is in a Busy state until the end of the transmission through the Link A, a determination is made that there is no possibility of performing the STR operation.

Determination may be made as to whether or not there is a possibility of performing the STR operation, on the basis of contents of the Multi-Link Elements exchanged between the AP and the STA. For example, in a case where power of the inter-link interference in the STA is higher than a threshold value, a determination is made that there is no possibility of performing the STR operation.

In a case where determination is made in step S2 that there is no possibility of performing the STR operation, the communication control section 22 of the AP decides, in step S3, transmission parameters of the Link A and the Link B to be used by the AP itself without considering the influence of the inter-link interference.

Meanwhile, in a case where determination is made in step S2 that there is a possibility of performing the STR operation, the processing proceeds to step S4. In step S4, the communication control section 22 of the AP decides transmission parameters of the Link A and the Link B on the basis of the inter-link interference information acquired from the STA and the inter-link interference information of itself. Here, the above expressions (1) to (3) are used to decide a transmission parameter of the AP itself and a transmission parameter of the STA.

In step S5, the communication control section 22 of the AP determines whether or not the transmission parameter of the Link A needs to be controlled by the STA during transmission through the Link B. This determination is made in consideration of the STR operation of the AP that receives signals through the Link A.

Ina case where determination is made in step S5 that the transmission parameter needs to be controlled by the STA, the communication control section 22 of the AP adds the STR Trigger Frame to the transmission data in step S6.

In step S7, the communication control section 22 of the AP starts data transmission to the STA using the Link A. In a case where the STR Trigger Frame is added in step S6, the STR Trigger Frame is transmitted to the STA, which allows the transmission parameter to be notified.

Meanwhile, in a case where determination is made in step S5 that the transmission parameter need not be controlled, the processing of step S6 is skipped. In this case, in step S7, the Trigger Frame is not added, and the data transmission to the STA is started using the Link A.

For example, in a case where there is no influence on data reception through the Link B even when the AP transmits transmission data at the maximum power using the Link A, a determination is made that the transmission parameter need not be controlled. In a case where the frequency of a channel used as the Link A and the frequency of a channel used as the Link B are distant from each other, there is less inter-link interference.

Also in a case where transmission parameters of the Link A and the Link B are decided in step S3 without considering the influence of the inter-link interference, the data transmission to the STA is started using the Link A in step S7, similarly.

Although not illustrated in FIG. 11, in a case where the AP gains a transmission right of the Link B thereafter, the AP starts the data transmission through the Link B using a transmission parameter decided in advance.

It is to be noted that, in a case where a determination is made that there is no possibility of performing the STR operation on the basis of the inter-link interference information, the start of the data transmission using the Link A of the STA may be delayed.

Operation of STA

Next, description is given of communication processing of the STA with reference to a flowchart in FIG. 12.

In step S11, the communication control section 22 of the STA finishes reception of a data signal through the Link A, for example.

In step S12, the communication control section 22 of the STA determines whether or not the STR Trigger Frame is included in the received data signal.

In a case where determination is made in step S12 that the STR Trigger Frame is included, the communication control section 22 of the STA determines in step S13 whether or not the data signal is being received through the Link B.

In a case where determination is made in step S13 that the data signals is received by the Link B, the processing proceeds to step S14.

In step S14, the communication control section 22 of the STA decides a transmission parameter on the basis of transmission parameter information included in the Trigger Dependent User Info inside the User Info field of the STR Trigger Frame. The transmission parameter information corresponds to the STR MCS and the STR Target RSSI described above decided in the AP as the transmission parameter to be used by the STA (FIG. 10). In this manner, the STA acquires the transmission parameter on the basis of the transmission parameter information included in the Trigger Dependent User Info. In addition, the communication control section 22 of the STA starts transmission of the data signal to the AP using the Link A.

In a case where it is known from Length information or the like that the reception of the data signal through the Link B is finished at the time point of starting data transmission using the Link A even when the data signal is being received through the Link B, the transmission of the data signal to the AP may be started in step S15.

In a case where another transmission parameter is included in the Trigger Dependent User Info, the communication control section 22 of the STA decides a transmission parameter to respond thereto.

It is to be noted that, as for information not included in the Trigger Dependent User Info, the communication control section 22 of the STA decides a transmission parameter on the basis of information included in the User Info field. In a case where the STR Trigger Dependent Common also includes a parameter, the transmission parameter is decided in accordance with the parameter as well.

Meanwhile, in a case where determination is made in step S13 that the data signal is not received through the link B, the processing proceeds to step S15.

In step S15, the communication control section 22 of the STA decides a transmission parameter on the basis of the transmission parameter information included in the User Info field of the STR Trigger Frame, and starts transmission of the data signal to the AP using the Link A.

Meanwhile, in a case where determination is made in step S12 that no STR Trigger Frame is included in the data signal from the AP, the processing proceeds to step S16.

In step S16, the communication control section 22 of the STA determines whether the data signal is not received through the Link B, or whether or not the STR operation is possible.

In a case where determination is made in step S16 that the data signal is not received through the Link B, or the STR operation is possible, the communication control section 22 of the STA starts transmission of the data signal through the Link A using a transmission parameter decided by itself in step S17.

Meanwhile, in a case where determination is made in step S16 that the data signal is received through the link B and the STR operation is not possible, the communication control section 22 of the STA waits for transmission of the data signal through the Link A in step S18. At this time, a transmission parameter may be decided on the basis of the transmission parameter information instructed by the Trigger Frame having been received most recently, and data transmission may be started using that transmission parameter.

In this manner, in the STA, the transmission parameter to be used is decided in response to states of the wireless communication units 12A and 12B.

Modification Example

Figure 13:
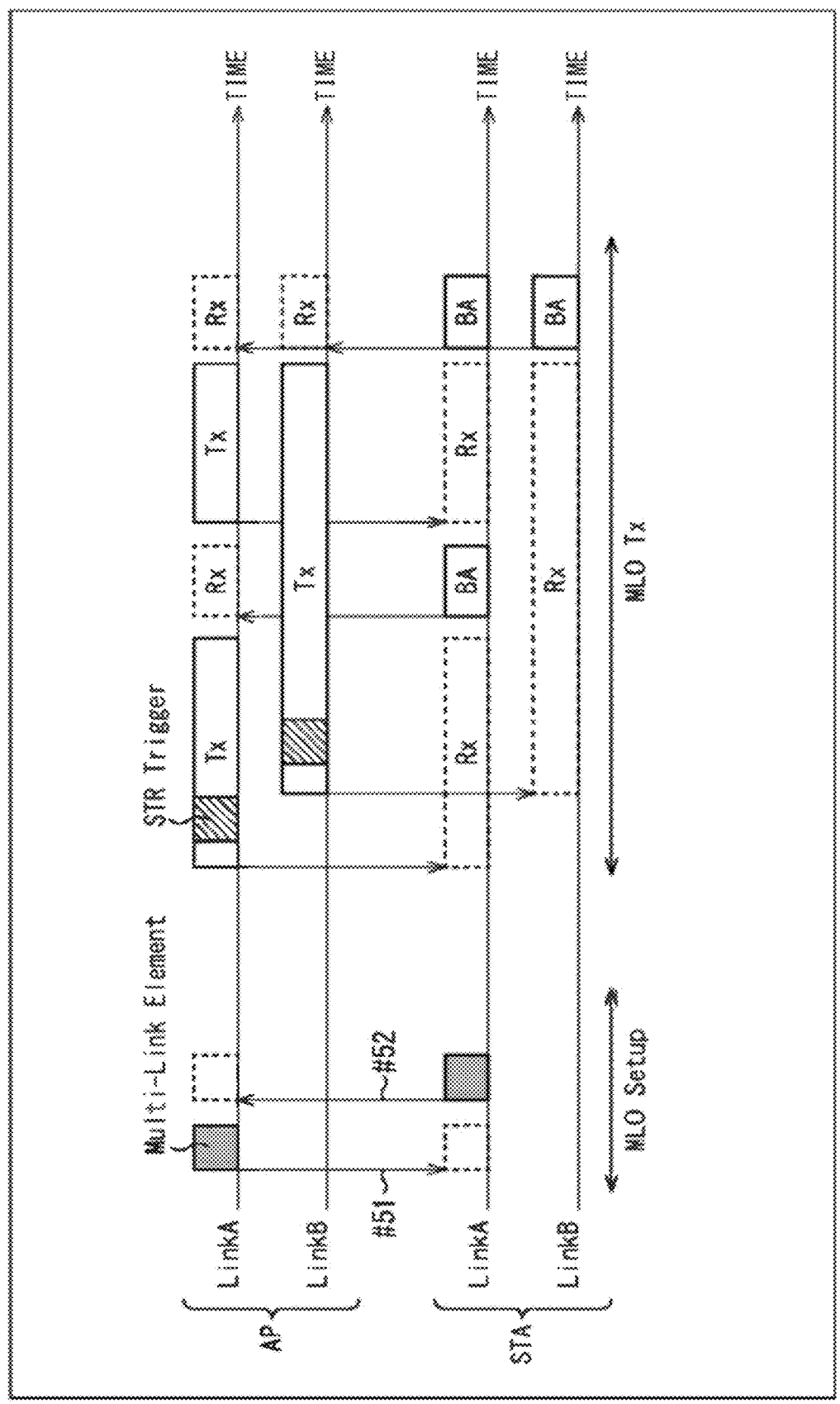
FIG. 13 illustrates another sequence in the transmission parameter control utilizing the Trigger Frame.

FIG. 13 illustrates another sequence in the transmission parameter control utilizing the Trigger Frame.

The sequence illustrated in FIG. 13 differs from the sequence illustrated in FIG. 5 in that, at the time of the MLO Setup Phase, the exchange of the Multi-Link Elements between the AP and the STA is not performed in each of the Link A and the Link B, but is performed only in the Link A, for example, which is one Link.

In the example of FIG. 13, as indicated by an arrow #51, the Multi-Link Element including the inter-link interference information in the AP is transmitted from the AP to the STA using the Link A. In addition, as indicated by an arrow #52, the Multi-Link Element including the inter-link interference information in the STA is transmitted from the STA to the AP using the Link A.

Figure 14:
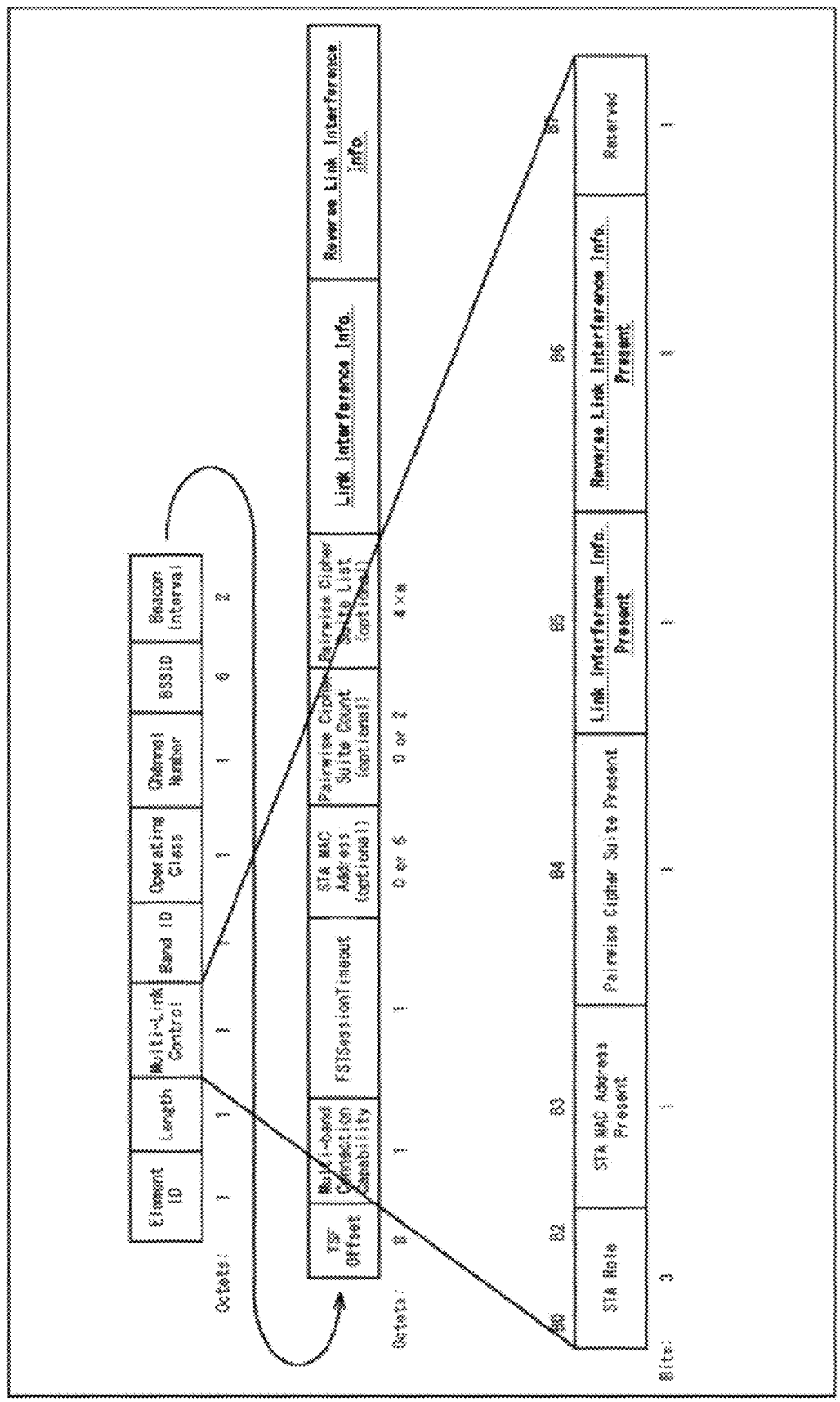
FIG. 14 illustrates an example of a data structure of Multi-Link Element.

FIG. 14 illustrates an example of a data structure of the Multi-Link Element to be transmitted and received in the sequence in FIG. 13.

The data structure illustrated in FIG. 14 differs from the structure illustrated in FIG. 6 in that a Reverse Link Interference Info. subfield is added to the end of the Multi-Link Element as illustrated on middle side of FIG. 14.

In a case where the Multi-Link Element having the data structure in FIG. 14 is transmitted using the Link A, the Link Interference Info Subfield includes information concerning the power of the inter-link interference from the Link B to the Link A. In addition, the Reverse Link Interference Info. subfield includes information concerning the inter-link interference power from the Link A to the Link B.

In this manner, it may also be possible to describe the inter-link interference information of the Link A and the inter-link interference information of the Link B in one Multi-Link Element to allow the inter-link interference information to be notified.

Second Embodiment: Transmission Parameter Control Utilizing MLO Parameter Set

<Example of Sequence>

Figure 15:
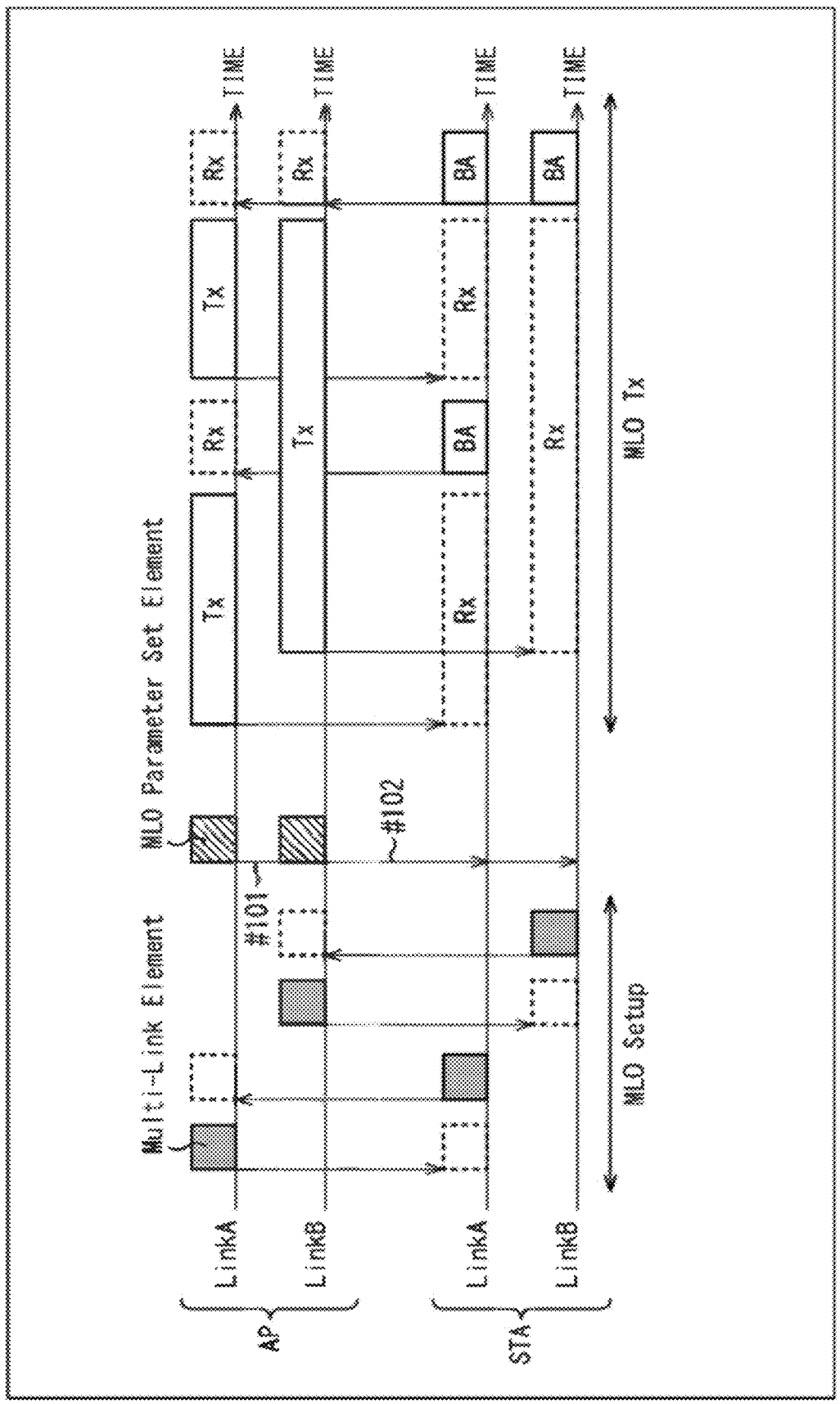
FIG. 15 illustrates a sequence in transmission parameter control utilizing MLO Parameter Set.

FIG. 15 illustrates a sequence in transmission parameter control utilizing MLO Parameter Set.

The sequence illustrated in FIG. 15 differs from the sequence illustrated in FIG. 5 in that MLO Parameter Set Element is transmitted between the MLO Setup Phase and the MLO Tx Phase. The MLO Parameter Set Element is Element to be used for notification of the transmission parameter of the STA. In the MLO Tx Phase, no STR Trigger Frame is transmitted.

In the example of FIG. 15, after the Multi-Link Element is transmitted and received in the MLO Setup Phase, the MLO Parameter Set Element is transmitted from the AP to the STA using the Link A and the Link B, as indicated by arrows #101 and #102.

The MLO Parameter Set Element is transmitted using a predetermined frame such as Beacon Frame, DMG Beacon Frame, (Re)Association Request Frame, and (Re)Association Response Frame. In Infrastructure BSS, the MLO Parameter Set Element is used by the AP to control the transmission parameter of the STA upon the STR operation.

In a case where transmission of a frame including the MLO Parameter Set Element is performed a plurality of times, the MLO Parameter Set Element included in a frame having been received most recently is used to update the transmission parameter in the STA.

It is to be noted that information included the MLO Parameter Set Element may be defined as information of a frame other than the element. For example, it may be possible for the information included in the MLO Parameter Set Element to be defined as information included in one frame of Control Frame, Action Frame, and Management Frame.

<Example of Frame Format>

Figure 16:
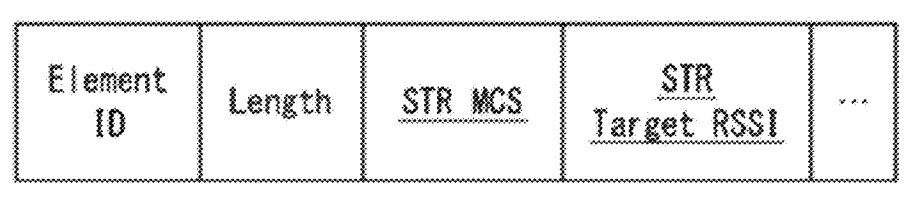

FIG. 16 illustrates a configuration example of the MLO Parameter Set Element.

As illustrated in FIG. 16, the MLO Parameter Set Element includes the STR MCS and the STR Target RSSI. As described with reference to FIG. 10, the STR MCS and the STR Target RSSI are each a transmission parameter to be used in performing the STR operation.

<Operation of Each Apparatus>

Here, description is given of operations of the AP and the STA at the time of transmission parameter control utilizing the MLO Parameter Set.

Figure 17:
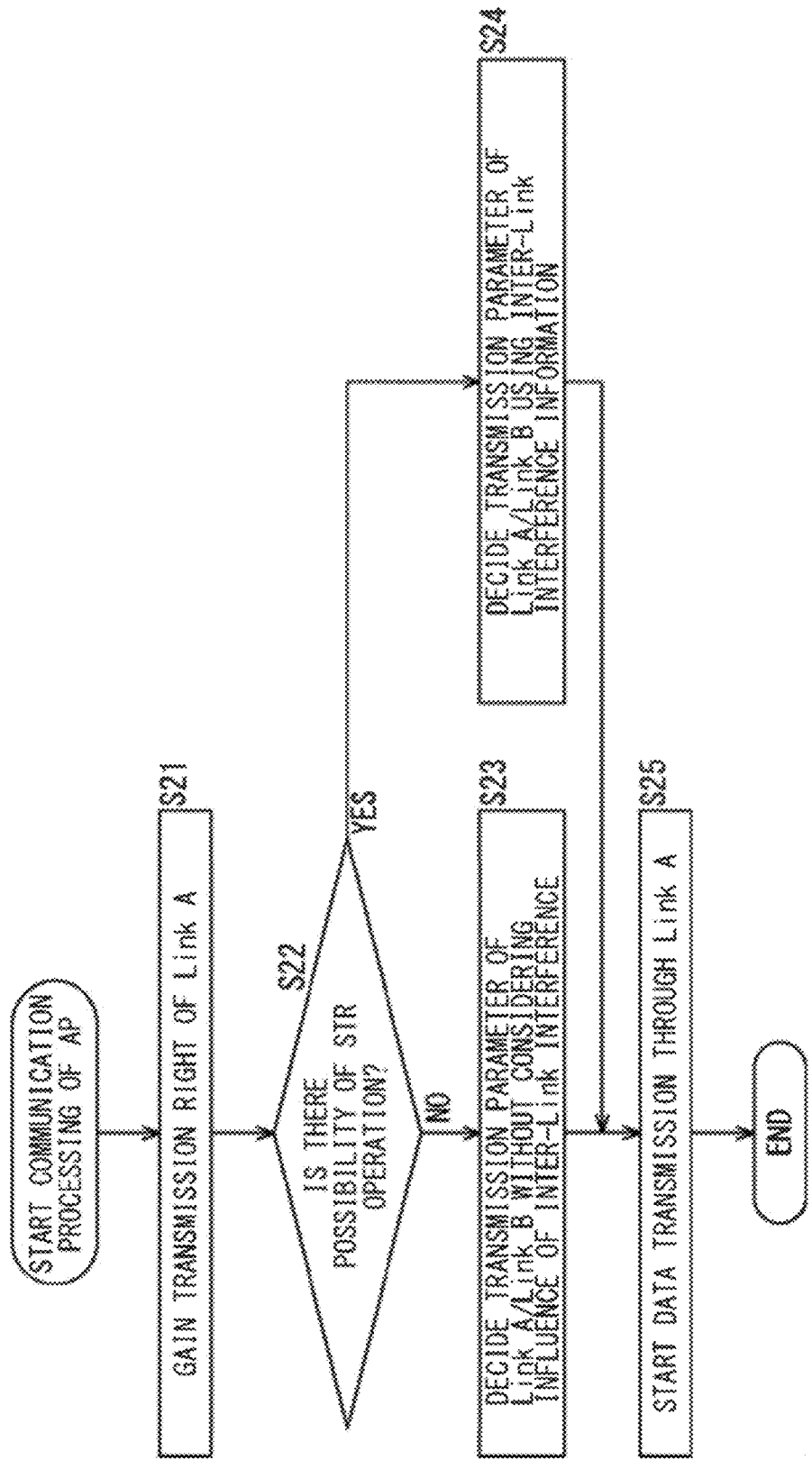
FIG. 17 is a flowchart that describes communication processing of an AP.
Figure 18:
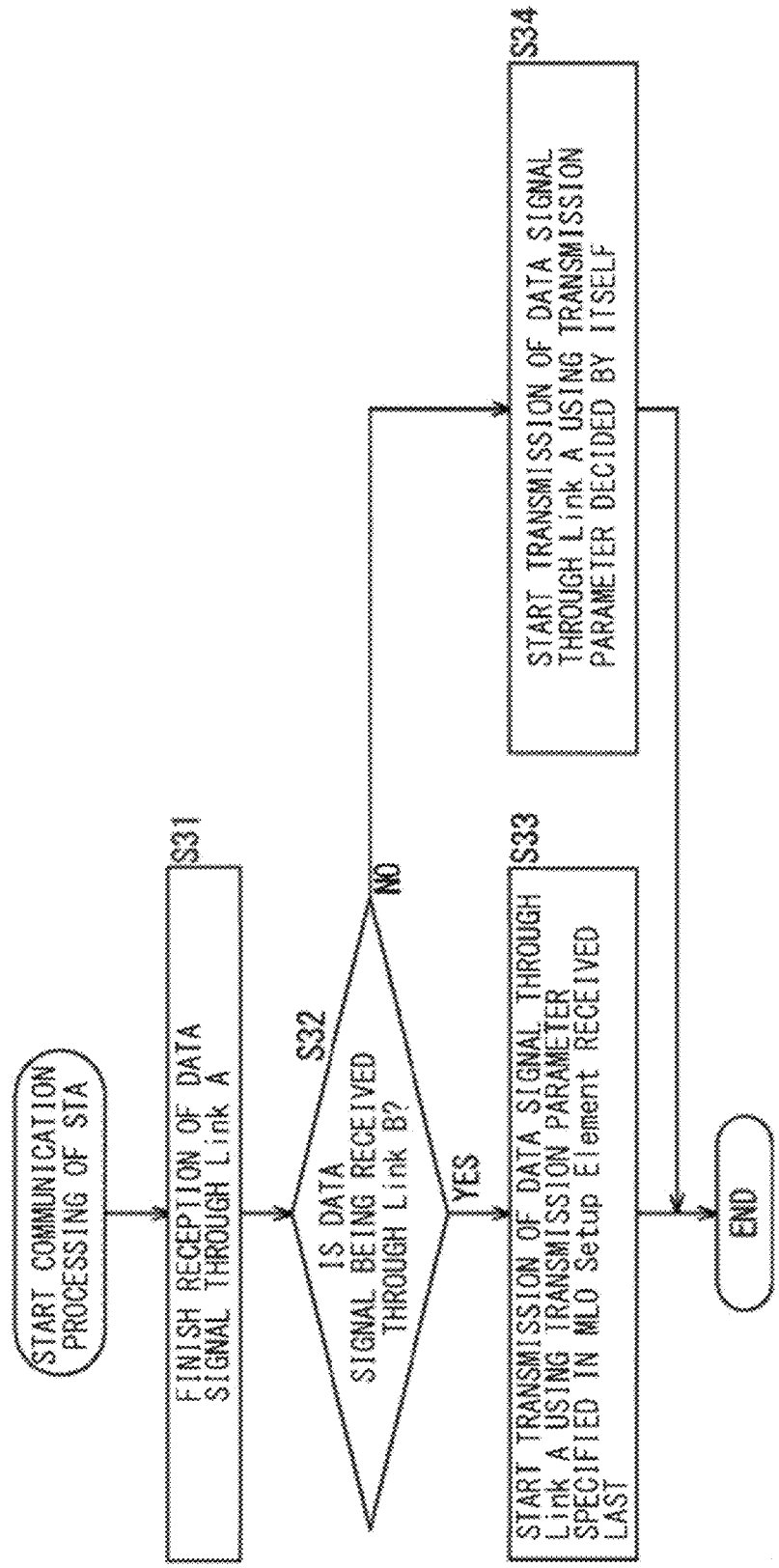
FIG. 18 is a flowchart that describes communication processing of an STA.

Pieces of processing illustrated in FIGS. 17 and 18 are pieces of processing to be performed by the AP and the STA after the MLO Setup Phase. Performing the MLO Setup Phase allows the inter-link interference information to be shared with each other between the AP and the STA.

Operation of AP

First, description is given of communication processing of the AP with reference to a flowchart in FIG. 17.

Pieces of processing in steps S21 to S25 in FIG. 17 are the same as the pieces of processing in steps S1 to S4 and S7 in FIG. 11, respectively. That is, no STR Trigger Frame is transmitted. Overlapped description is omitted as appropriate.

In step S21, the communication control section 22 of the AP gains a transmission right of the Link A, for example.

In step S22, the communication control section 22 of the AP determines whether or not there is a possibility of performing the STR operation.

In a case where determination is made in step S22 that there is no possibility of performing the STR operation, the communication control section 22 of the AP decides transmission parameters of the Link A and the Link B to be used by the AP itself, in step S23, without considering the influence of the inter-link interference.

Meanwhile, in a case where determination is made in step S22 that there is a possibility of performing the STR operation, the communication control section 22 of the AP decides transmission parameters of the Link A and the Link B in step S24 on the basis of the inter-link interference information acquired from the STA and the inter-link interference information of itself. Here, the above expressions (1) to (3) are used to decide a transmission parameter of the AP itself and a transmission parameter of the STA.

After the transmission parameters are decided in step S23 or step S24, the communication control section 22 of the AP starts data transmission to the STA using the Link A in step S25. Ina case where the transmission parameter of the AP itself and the transmission parameter of the STA are decided in step S24, the transmission parameter of the STA is notified from the AP to the STA using the MLO Parameter Set appropriately before the data transmission.

Operation of STA

Next, description is given of communication processing of the STA with reference to the flowchart in FIG. 12.

In step S31, the communication control section 22 of the STA finishes reception of the data signal through the Link A, for example.

In step S32, the communication control section 22 of the STA determines whether or not the data signal is being received through the Link B.

Ina case where determination is made in step S32 that the data signal is received through the Link B, the communication control section 22 of the STA starts transmission of the data signal to the AP in step S33 using the Link A and using a transmission parameter specified in MLO Setup Element received last.

Meanwhile, in a case where determination is made in step S32 that the data signal is not received through the link B, the communication control section 22 of the STA starts transmission of the data signal through the Link A in step S34 using a transmission parameter decided by itself.

In this manner, it may be possible to allow the transmission parameter to be notified utilizing the MLO Parameter Set.

<<Others>>

Application Example

In the above description, the description has been given mainly of the case where the number of Links to be used for the MLO communication is two; however, the MLO communication may be performed using three or more Links.

In this case, expressions to be used to decide the transmission parameter are complicated as compared with the above expressions (1) to (3); however, similarly to the case where the two Links are used, it may be possible to calculate the transmission parameter on the basis of the propagation loss and the inter-link interference information. A plurality of pieces of information such as BSSID, Operating Class, Channel Number, and Band ID included in FIGS. 6 and 14 may be included in the same element.

Although the description has been given mainly of the case of controlling the transmission parameter in the STR operation, the present technology is also applicable to other controls.

For example, there is a possibility that, when starting transmission of a data signal through the Link A, signal detection by means of carrier sense using the Link B may not be sufficiently performed due to the influence of the inter-link interference. Even in such a case, appropriately deciding the transmission parameter of the Link A on the basis of the inter-link interference information or the like makes it possible to improve the probability of successful carrier sense of the Link B.

Although the description has been given of the case where the AP notifies the STA of the transmission parameter upon the STR operation, the STA may notify the AP of the transmission parameter. In this case, the STA controls the transmission parameter upon the STR operation of the AP.

In a case where the STA controls the transmission parameter upon the STR operation of the AP, the same processing as the processing of the AP described above is performed by the STA. Conversely, the same processing as the processing of the STA described above is performed by the AP.

In this manner, it is possible for various communication apparatuses other than the AP to control the transmission parameter upon the STR operation.

Information, which indicates that a transmission parameter notified by the AP is applied to the STR operation, may be included in transmission data to be transmitted from the STA to the AP. It follows that the STA notifies the AP that the STR operation is performed using a transmission parameter decided by the AP.

In order to transmit the information indicating that the transmission parameter is applied to the STR operation, for example, 1-bit Field may be secured inside SIG of Preamble or inside Control Field.

Concerning Effects

In the MLO terminal that is able to perform data transmission using a plurality of Links, exchanging respective inter-link interferences on transmission side and reception side in advance makes it possible to decide such a transmission parameter as not to be influenced by the inter-link interference occurring upon the STR operation.

In addition, for example, even in a case where data transmission times of the Link A and the Link B do not coincide with each other and data transmission of the Link A is finished first, it is possible for the transmission side to receive the Block Ack through the Link A while continuing transmission of data signals through the Link B. This eliminates the necessity of operations, which causes overhead, such as shortening of transmission time of the Link B and padding of the Link A until data transmission through the Link B is finished.

According to the transmission parameter control utilizing the Trigger Frame as the first embodiment, inserting the Trigger Frame for the Multi-Link into the transmission data enables the AP to notify the STA on the reception side of an appropriate transmission parameter and to cause the STA to set the transmission parameter.

In addition, notifying a transmission parameter in a case of not performing the STR operation to be included in the Trigger Frame together with a transmission parameter for the STR operation eliminates the necessity of the control of a transmission parameter for a normal operation in which no STR operation is performed. That is, in a case where no STR operation is performed in the STA, the AP need not notify the STA of the transmission parameter for the normal operation separately from the transmission parameter for the STR operation.

According to the transmission parameter control utilizing the MLO Parameter Set as the second embodiment, setting a transmission parameter before starting the data transmission with the Multi-Link enables the AP to control the transmission parameter of the STA without adding information (frame) for each data transmission.

The present technology has a wide range of application, and is implementable with few change from a specification of the existing IEEE 802 11.

Example of Program

The series of processing described above may be executed by hardware or may be executed by software. In a case of executing the series of processing by software, a program included in the software is installed in a computer incorporated into dedicated hardware or in a general-purpose personal computer, etc., from a program recording medium.

The program to be executed by the computer may be a program in which processing is performed in time series in the order described in the present specification, or may be a program in which pieces of processing are performed in parallel or at a necessary timing such as the time when a call is made.

In the present specification, the term "system" means a set of a plurality of components (devices, modules (parts), etc.), regardless of whether or not all the components exist in the same casing. Accordingly, a plurality of devices housed in separate casings and coupled via a network, and one device in which a plurality of modules is housed in one casing are each a system.

It is to be noted that the effects described herein are merely illustrative and not limiting, and may have other effects.

The embodiment of the present technology is not limited to the above-described embodiments, and may be modified in a wide variety of ways without departing from the gist of the present technology.

<Example of Combination of Configurations>

The present technology may also have the following configurations.

(1)

A communication apparatus including a communication control section that acquires, in a case of simultaneously performing transmission and reception of a data signal with another communication apparatus using a plurality of Links, first interference information concerning interference between Links occurring in the other communication apparatus, from the other communication apparatus, and decides a transmission parameter to be used by the other communication apparatus for transmission of a data signal on a basis of the first interference information and second interference information concerning interference between the Links occurring in the communication apparatus.

(2)

The communication apparatus according to (1), further including a plurality of wireless communication units that performs transmission and reception of a data signal with the other communication apparatus using mutually different Links, in which the communication control section transmits, to the other communication apparatus, an element including the second interference information and Capability information concerning communication in the plurality of wireless communication units.

(3)

The communication apparatus according to (2), in which the communication control section transmits, to the other communication apparatus, a notification signal, which includes a frame including one or more of the elements, or a signal to be used upon coupling.

(4)

The communication apparatus according to (2) or (3), in which the communication control section sorts a plurality of the elements in response to the second interference information.

(5)

The communication apparatus according to any one of (2) to (4), in which the communication control section generates the element including, as the second interference information, information concerning interference between the Links to be received by the wireless communication unit transmitting a data signal.

(6)

The communication apparatus according to any one of (2) to (5), in which the communication control section generates the element including information concerning interference between the Links to be received by the wireless communication unit transmitting a data signal and information concerning interference between the Links to be received by another of the wireless communication units transmitting a data signal.

(7)

The communication apparatus according to any one of (2) to (6), in which the communication control section decides the transmission parameter to be used by the other communication apparatus in the case of simultaneously performing transmission and reception of a data signal to notify the other communication apparatus.

(8)
The communication apparatus according to (7), in which the communication control section decides, as the transmission parameter, information concerning a modulation scheme and information concerning transmission power.

(9)
The communication apparatus according to (7) or (8), in which the communication control section generate an induction frame that includes the transmission parameter and induces the other communication apparatus to transmit a data signal using the transmission parameter.

(10)
The communication apparatus according to any one of (7) to (9), in which the communication control section generates a notification signal, which includes a frame including the transmission parameter, or a signal to be used upon coupling.

(11)
The communication apparatus according to any one of (2) to (10), in which the communication control section decides a transmission parameter of the communication apparatus to be used in the case of simultaneously performing transmission and reception of a data signal in the plurality of wireless communication units on a basis of the first interference information and the second interference information.

(12)
An information processing method including causing a communication apparatus to
acquire, in a case of simultaneously performing transmission and reception of a data signal with another communication apparatus using a plurality of Links, first interference information concerning interference between Links occurring in the other communication apparatus, from the other communication apparatus, and
decide a transmission parameter to be used by the other communication apparatus for transmission of a data signal on a basis of the first interference information and second interference information concerning interference between the Links occurring in the communication apparatus.

(13)
A communication apparatus including a communication control section that
transmits, to another communication apparatus, first interference information concerning interference between Links occurring in a case of simultaneously performing transmission and reception of a data signal with the other communication apparatus using a plurality of Links, and
acquires a transmission parameter to be used for transmission of a data signal decided by the other communication apparatus on a basis of the first interference information and second interference information concerning interference between the Links occurring in the other communication apparatus.

(14)
The communication apparatus according to (13), in which the communication control section acquires the transmission parameter included in an induction frame that induces transmission of a data signal using the transmission parameter.

(15)
The communication apparatus according to (14), further including a plurality of wireless communication units that performs transmission and reception of a data signal with the other communication apparatus using mutually different Links, in which
the communication control section decides the transmission parameter to be used in response to states of the plurality of wireless communication units.

(16)
The communication apparatus according to (14), in which the communication control section performs transmission of a data signal using the transmission parameter included in the induction frame in the case of simultaneously performing transmission and reception of a data signal.

(17)
The communication apparatus according to any one of (13) to (16), in which the communication control section acquires a notification signal, which includes a frame including the transmission parameter, or the transmission parameter included in a signal to be used upon coupling.

(18)
The communication apparatus according to any one of (13) to (17), in which the communication control section performs transmission of a data signal using the transmission parameter acquired last.

(19)
An information processing method including causing a communication apparatus to
transmit, to another communication apparatus, first interference information concerning interference between Links occurring in a case of simultaneously performing transmission and reception of a data signal with the other communication apparatus using a plurality of Links, and
acquire a transmission parameter to be used for transmission of a data signal decided by the other communication apparatus on a basis of the first interference information and second interference information concerning interference between the Links occurring in the other communication apparatus.

REFERENCE NUMERALS LIST communication apparatus
11A, 11B antenna
12A, 12B wireless communication unit
13 radio signal processing unit
21 storage section
22 communication control section
23 data processing section
24A, 24B data processing section
25A, 25B wireless interface section

The invention claimed is:
1. A communication apparatus comprising: communication control circuitry that
acquires, from another communication apparatus in a case of simultaneously performing transmission and reception of a data signal with the other communication apparatus using a plurality of links, first interference information concerning interference between links of the plurality of links that occurs in the other communication apparatus,
decides a transmission parameter to be used by the other communication apparatus for transmission of a data signal on a basis of the first interference information and second interference information concerning interference between the links of the plurality of links that occurs in the communication apparatus, and
after a communication set up phase, communicates the transmission parameter to the other communication apparatus,
wherein the communication control circuitry transmits, to the other communication apparatus, an element includ- ing the second interference information and capability information concerning communication in a plurality of wireless communication circuits, and the communication control circuitry sorts a plurality of the elements in response to the second interference information.

2. The communication apparatus according to claim 1, further comprising a plurality of wireless communication circuits that performs transmission and reception of a data signal with the other communication apparatus using mutually different links.

3. The communication apparatus according to claim 2, wherein the communication control circuitry transmits, to the other communication apparatus, a notification signal, which comprises a frame including one or more of the elements, or a signal to be used upon coupling.

4. The communication apparatus according to claim 2, wherein the communication control circuitry generates the element including, as the second interference information, information concerning interference between the links to be received by a wireless communication circuit of the plurality of wireless communication circuits transmitting a data signal.

5. The communication apparatus according to claim 2, wherein the communication control circuitry generates the element including information concerning interference between the links to be received by a wireless communication circuit of the plurality of the wireless communication circuits transmitting a data signal and information concerning interference between the links to be received by another wireless communication circuit of the plurality of wireless communication circuits transmitting a data signal.

6. The communication apparatus according to claim 2, wherein the communication control circuitry decides a transmission parameter of the communication apparatus to be used in the case of simultaneously performing transmission and reception of a data signal in the plurality of wireless communication circuits on a basis of the first interference information and the second interference information.

7. The communication apparatus according to claim 1, wherein the communication control circuitry decides the transmission parameter to be used by the other communication apparatus in the case of simultaneously performing transmission and reception of a data signal to notify the other communication apparatus.

8. The communication apparatus according to claim 7, wherein the communication control circuitry decides, as the transmission parameter, information concerning a modulation scheme and information concerning transmission power.

9. The communication apparatus according to claim 7, wherein the communication control circuitry generates an induction frame that includes the transmission parameter, communicates the induction frame to the other communication apparatus, and induces the other communication apparatus to transmit a data signal using the transmission parameter.

10. The communication apparatus according to claim 7, wherein the communication control circuitry generates a notification signal, which comprises a frame including the transmission parameter, or a signal to be used upon coupling, and transmits the one of the notification signal and the signal to be used upon coupling to the other communication apparatus.

11. An information processing method comprising:

causing a communication apparatus to acquire, from another communication apparatus in a case of simultaneously performing transmission and reception of a data signal with the other communication apparatus using a plurality of links, first interference information concerning interference between links of the plurality of links occurring in the other communication apparatus, causing the communication apparatus to decide a transmission parameter to be used by the other communication apparatus for transmission of a data signal on a basis of the first interference information and second interference information concerning interference between the links of the plurality of links occurring in the communication apparatus, and causing the communication apparatus to, after a communication set up phase, communicate the transmission parameter to the other communication apparatus, wherein the method further comprises:

causing the communication apparatus to transmit, to the other communication apparatus, an element including the second interference information and capability information concerning communication in a plurality of wireless communication circuits, and causing the communication apparatus to sort a plurality of the elements in response to the second interference information.

12. A communication apparatus comprising: communication control circuitry that transmits, to another communication apparatus, first interference information concerning interference between links occurring in a case of simultaneously performing transmission and reception of a data signal with the other communication apparatus using a plurality of links, the links being included in the plurality of links, and acquires, from the other communication apparatus and after a communication set up phase, a transmission parameter to be used for transmission of a data signal decided by the other communication apparatus on a basis of the first interference information and second interference information concerning interference between the links of the plurality of links occurring in the other communication apparatus, wherein an element including the second interference information and capability information concerning communication in a plurality of wireless communication circuits is transmitted to the other communication apparatus, and a plurality of the elements are sorted in response to the second interference information.

13. The communication apparatus according to claim 12, wherein the communication control circuitry acquires the transmission parameter included in an induction frame that is transmitted by the other communication apparatus and that induces transmission of a data signal using the transmission parameter by the communication apparatus.

14. The communication apparatus according to claim 13, further comprising a plurality of wireless communication circuits that performs transmission and reception of a data signal with the other communication apparatus using mutually different links, wherein the communication control circuitry decides the transmission parameter to be used in response to states of the plurality of wireless communication circuits.

15. The communication apparatus according to claim 13, wherein the communication control circuitry performs transmission of a data signal using the transmission parameter included in the induction frame in the case of simultaneously performing transmission and reception of a data signal.

16. The communication apparatus according to claim 12, wherein the communication control circuitry acquires a notification signal, which comprises a frame including the transmission parameter, or the transmission parameter included in a signal to be used upon coupling, from the other communication apparatus.

17. The communication apparatus according to claim 12, wherein the communication control circuitry performs transmission of a data signal using the transmission parameter acquired last.

18. An information processing method comprising:
causing a communication apparatus to transmit, to another communication apparatus, first interference information concerning interference between links occurring in a case of simultaneously performing transmission and reception of a data signal with the other communication apparatus using a plurality of links, the links being included in the plurality of links, and
causing the communication apparatus to acquire, from the other communication apparatus and after a communication set up phase, a transmission parameter to be used for transmission of a data signal decided by the other communication apparatus on a basis of the first interference information and second interference information concerning interference between the links of the plurality of links occurring in the other communication apparatus,
wherein an element including the second interference information and capability information concerning communication in a plurality of wireless communication circuits is transmitted to the other communication apparatus, and
a plurality of the elements are sorted in response to the second interference information.

\* \* \* \* \*